(12) United States Patent  (10) Patent No.: US 7,786,977 B2
Abe                        (45) Date of Patent:     Aug. 31, 2010

(54) POSITION INPUT DEVICE, REMOTE CONTROL DEVICE, COMPUTER SYSTEM AND ELECTRONIC EQUIPMENT

(75) Inventor: Masahiko Abe, Saitama-ken (JP)

(73) Assignee: Wacom Co., Ltd., Saitama-ken (JP)

( * ) Notice: Subject to any disclaimer, the term of this patent is extended or adjusted under 35 U.S.C. 154(b) by 889 days.

(21) Appl. No.: 11/657,583

(22) Filed: Jan. 25, 2007

(65) Prior Publication Data

US 2007/0176894 A1    Aug. 2, 2007

(30) Foreign Application Priority Data

Jan. 30, 2006 (JP) ............... P2006-020435
Jan. 30, 2006 (JP) ............... P2006-020878

(51) Int. Cl.
  *G09G 5/00* (2006.01)
(52) U.S. Cl. ............ 345/156; 345/204; 345/184; 345/629; 345/630
(58) Field of Classification Search ......... 345/156–161, 345/173, 179, 8, 163, 168, 171, 177, 184, 345/204, 629, 630; 341/176, 31, 35; 178/18.06
See application file for complete search history.

(56) References Cited

U.S. PATENT DOCUMENTS

| | | | |
|---|---|---|---|
| 6,469,692 B2 * | 10/2002 | Rosenberg | 345/161 |
| 2002/0171625 A1 * | 11/2002 | Rothchild | 345/156 |
| 2004/0222979 A1 * | 11/2004 | Knighton | 345/184 |
| 2005/0078084 A1 * | 4/2005 | Simon et al. | 345/156 |
| 2005/0128191 A1 * | 6/2005 | Katsurahira et al. | 345/179 |
| 2005/0138886 A1 * | 6/2005 | Sanoner et al. | 52/720.1 |
| 2005/0177317 A1 * | 8/2005 | Hsiung et al. | 702/22 |
| 2006/0066590 A1 * | 3/2006 | Ozawa et al. | 345/173 |
| 2006/0114221 A1 * | 6/2006 | Sakurai et al. | 345/156 |
| 2006/0117894 A1 * | 6/2006 | Sawada et al. | 74/479.01 |
| 2006/0256090 A1 * | 11/2006 | Huppi | 345/173 |
| 2006/0267580 A1 * | 11/2006 | Fukushima et al. | 324/207.13 |
| 2007/0273611 A1 * | 11/2007 | Torch | 345/8 |
| 2008/0165138 A1 * | 7/2008 | Li | 345/173 |

* cited by examiner

*Primary Examiner*—Prabodh M Dharia
(74) *Attorney, Agent, or Firm*—Berenato & White, LLC

(57) ABSTRACT

A position input device is provided which includes a sensor portion having a detection face, an operation element movable along the detection face of the sensor portion, and a position detection unit which detects the position of the operation element on the detection face. According to additional embodiments, the position input device includes a lid covering the detection face. The lid is movable between opened and closed states, and integrally supports the operation element so as to move integrally with the lid when the lid is opened and closed. A remote control device including the position input device and a wireless transmission unit are also provided. Also provided are computer systems and electronic devices.

20 Claims, 25 Drawing Sheets

POSITION INPUT DEVICE, REMOTE CONTROL DEVICE, COMPUTER SYSTEM AND ELECTRONIC EQUIPMENT

CROSS-REFERENCES TO RELATED APPLICATIONS

The present application claims the benefit of priority from Japanese Application No. P2006-020435, filed on Jan. 30, 2006, the disclosure of which is incorporated herein by reference in its entirety.

The present application also claims priority from Japanese Application No. P2006-020878, filed on Jan. 30, 2006, the disclosure of which is incorporated herein by reference in its entirety.

FIELD OF THE INVENTION

The present invention relates to a position input device to perform position input operations, a remote control device comprising this position input device, a computer system, and electronic equipment.

BACKGROUND OF THE INVENTION

Remote operation devices (so-called remote control devices) are used with numerous household electronic products, for example as disclosed in Japanese Patent Laid-open No. 05-056484. Many remote control devices comprise numerous keys corresponding to functions possessed by the equipment to be operated.

As DVD recorders and other household electronic products have acquired more functions and features in recent years, the number of keys provided on remote control devices to operate these products has increased markedly, and operation has become exceedingly complex. With the aim of simplifying operation of such highly functional products, there have for example been attempts to employ hierarchical-structure menus. However, operations to select menus using keys provided on the remote control device are themselves a major burden on the user. Hence a method of operating various types of equipment with numerous functions simply has been sought.

SUMMARY OF THE INVENTION

Aspects of this invention were devised in light of the above-described circumstances, and have as an object the provision of a device or method to enable simple operation of equipment having a plurality of functions.

In order to resolve the above problem, a first aspect of this invention provides a position input device comprising a sensor portion having a detection face, an operation element movable along the detection face of the sensor portion, and a position detection unit for detecting the position of the operation element on the detection face.

When an operation is performed by moving the operation element, the position of the operation element on the detection face of the sensor portion corresponding to this operation is detected. Thus, the user can input positions merely by moving the operation element to a selected position along the detection face. Further, the operation element is supported in a manner enabling movement along the detection face, so that the user need merely move the operation element along the detection face, and need not maintain an appropriate distance between the operation element and the detection face. As a result, position input can be performed extremely easily. Hence when this position input device is used as a device for operation of electronic equipment or a computer, operations for position input to the electronic equipment or computer can be performed easily, and operability can be greatly improved. Further, the position detection unit detects the position of the operation element on the detection face, and so operations can be performed adequately even when the operation element is moved only a small distance. Advantageously, the position input device may possess a simple construction and compactness.

In an implementation of this first aspect of the invention, the operation element may comprise a plate portion placed upon the detection face, and an operation protuberance portion, which is positioned erect on the plate portion. In this implementation, the user need only move the operation protuberance portion to perform operations, so that position input operations can be performed easily.

In another implementation of this aspect of the invention, the upper face of the operation protuberance portion may be formed with a curved surface. Because of the curved surface, when for example the user moves the operation protuberance portion using a finger, the subjective operability can be improved. Operability can be further improved by provided curved-tip protrusions on the curved surface.

In still another implementation of this aspect of the invention, a friction layer, at which prescribed friction occurs upon movement of the plate portion with respect to the detection face, may be provided between the plate portion and the detection face. The friction layer causes an appropriate resistance to occur when the plate portion is moved. Advantageously, the sensation of operational stability is enhanced.

In yet another implementation of this aspect of the invention, a rolling support portion, which rolls during movement of the plate portion while supporting the plate portion, may be provided between the plate portion and the detection face. In this implementation, the resistance during movement of the plate portion is markedly reduced, so that there is the advantageous result that the user is less burdened during operation during operation of the position input device.

According to a further implementation of this aspect of the invention, a support mechanism is provided to enable sliding support of the operation element along the detection face in a prescribed direction and in a direction perpendicular to the prescribed direction. Simply by moving the operation element, supported by the support mechanism, to an arbitrary/selected position, position input operations can be performed extremely easily. Optionally, the support mechanism may comprise perpendicular wires supporting the operation element, and slide support members.

In still a further implementation of this first aspect of the invention, coils are incorporated into both the sensor portion and the operation element, and the position detection unit detects the position of the operation element based on the electromagnetic coupling which occurs between the coils incorporated in the sensor portion and in the operation element. In this manner, the position of the operation element with respect to the detection face of the sensor portion can be detected quickly and reliably.

In the above implementation, the coil in the sensor portion may comprise a plurality of loop coils which form rings along the detection face of the sensor portion. In this implementation, the detection face of the sensor portion can easily be made thin, and the position of the operation element can be detected accurately and reliably.

In yet a further implementation of this aspect of the invention, the position detection unit may detect the position of the operation element with respect to the operation face based on the electrostatic coupling state between the sensor portion and the operation element. Alternatively, the position detection unit may detect the position of the operation element relative to the operation face by detecting the pressure applied to the operation face by the operation element.

It should be understood that the above implementations may be practiced in various combinations with one another, and with other aspects of the invention.

According to a second aspect of the invention, a remote control device is provided which comprises the above position input device of the first aspect of the invention, and a wireless transmission unit for wirelessly transmitting a signal indicating the position of the operation element detected by the position input device.

In a preferred operation of the second aspect, a signal indicating the position detected by the position input device is wirelessly transmitted. Advantageously, position input operations can easily be performed, simplifying operation of the equipment using the remote control device.

In an implementation of this second aspect of the invention, the remote control device may comprise a main unit with a hollow portion, and a hole connected to the hollow portion provided in one face of the main unit. The sensor portion of the position input device is housed in the hollow portion, with at least a portion of the operation element of the position input device exposed through the hole connected to the hollow portion.

A third aspect of this invention provides a computer system comprising the above remote control device; a display unit to display images on a display screen; a reception unit to receive signals transmitted by a wireless transmission unit comprising the remote control device; and a computer comprising a control unit which changes the display on the display screen based on signals received from the reception unit.

A fourth aspect of this invention provides electronic equipment, comprising the above position input device and a display screen, and characterized in that the display on the display screen is changed based on the position detected by the position input device.

A fifth aspect of the invention provides method of operating the inventions of the first to fourth aspects of the invention. For example, in a method of operating the position input device of the first aspect, an operation element is moved along a detection face of a sensor portion, and a position detecting unit detects the position of the operation element on the detection face.

A position input device of a sixth aspect this invention comprises a sensor portion having a detection face, a lid which can be opened and closed covering the detection face of the sensor portion, an operation element movable along the detection face in the state in which the lid is closed and mounted on the lid so as to move integrally with the lid when the lid is opened and closed, a position detection unit for detecting the position of the operation element with respect to the detection face, and an external position indicator. According to this aspect, with the lid in the opened state, the position detection unit detects the operation position when an operation is performed on the detection face using the external position indicator.

Preferably in operation of the sixth aspect, when the lid is closed, operations are performed with the operation element and the operation element position is detected. On the other hand, when the lid is open, operations are performed with the external position indicator and the operation position is detected. Hence by closing and opening the lid, it is possible to switch between operations using the operation element mounted on the lid, and operations using the external position indicator. This switching feature provides the user with the freedom to select the desired operation method, or select the operation method appropriate for a desired operation. The operability of the position input device for performing position input operations can be markedly enhanced in this manner. Further, when the position input device is used as an operation device in electronic equipment, computers, and various other equipment, position input operations for the various equipment can easily be performed, so that even equipment having complicated functions can be operated without difficulty, and operability can be greatly improved.

In an implementation of this sixth aspect of the invention, a configuration may be employed in which a hole is formed in the lid, and the operation element is exposed inside of the hole. In this case, an operation may be performed by moving the operation element inside the hole, so that more direct control is possible.

In another implementation of this sixth aspect of the invention, a configuration may be employed in which the operation element comprises a plate portion having a flat face substantially parallel to the detection face, and an operation protuberance portion erect on this plate portion and protruding from the hole. By moving the operation protuberance portion, position input operations can be performed simply.

In still another implementation of this aspect of the invention, a configuration may be employed in which the position detection unit detects the position of the position indicator and the position of the operation element, as an absolute position in a detection area set in advance on the detection face. Different detection areas on the detection face are set when the lid is in the opened state and when the lid is in the closed state. In this case, when the range over which the operation element can move with the lid in the closed state does not coincide with the range over which operations are possible using the external position indicator with the lid in the opened state, different detection areas corresponding to the range of operation with lid in the opened and closed states are set. Consequently, position detection appropriately corresponds to the available detection area on which the user operations can be performed.

In still another implementation of this aspect of the invention, a configuration may be employed in which a support mechanism is provided which supports the operation element to enable sliding of the operation element along the detection face, in a prescribed direction and in the direction perpendicular to the prescribed direction. In this configuration, preferably position input can be easily performed simply by moving the operation element supported by the support mechanism to an arbitrary/selected position. Optionally, the support mechanism may comprise perpendicular wires supporting the operation element, and slide support members.

In a further implementation of this aspect of the invention, a configuration may be employed in which, when an operation to open the lid or an operation to close the lid is performed, the position detection unit halts operations to detect position for a prescribed length of time. When the operation element is moved together with the lid while opening or closing the lid, the position of the operation element is not detected. As a result, a position not intended for detection by the user, i.e., corresponding to the opening or closing of the lid, is not detected. Advantageously, possibly confusing, unintended operations are avoided.

In a further embodiment of this aspect of the invention, coils may be provided in both the sensor portion and in the operation element, and the position detection unit may detect the position of the operation element based on the electromagnetic coupling which occurs between the coils of the sensor portion and of the operation element. The coils preferably permit quick and reliable detection of the position of the operation element with respect to the detection face of the sensor portion, and the position of operation by the position indicator.

In still a further embodiment of this aspect of the invention, the coil in the sensor portion may comprise a plurality of loop coils forming rings along the detection face of the sensor portion. In this configuration, the detection face of the sensor portion can easily be made thin, and the position of the operation element can be detected accurately and reliably.

In yet a further embodiment of this aspect of the invention, the position detection unit may detect the position of the operation element with respect to the detection face based on the electrostatic coupling state between the sensor portion and the operation element. Alternatively, the position detection unit may detect the position of the operation element with respect to the detection face by detecting a depressing pressure applied by the operation element to the detection face.

It should be understood that the above implementations may be practiced in various combinations with one another, and with other aspects of the invention.

A seventh aspect of this invention provides a remote control device, comprising the above position input device of the sixth aspect, and a wireless transmission unit for wirelessly transmitting signals indicating the position of the operation element, or the position of operation of the position indicator, detected by the position input device.

An eighth aspect of this invention provides a remote operation system, comprising the above remote control device of the seventh aspect, and equipment for operation, including a display unit for displaying images on a display screen, a reception unit for receiving signals transmitted from the wireless transmission unit of the remote control device, and a control unit for changing the display on the display screen based on signals received by the reception unit.

A ninth aspect of the invention provides method of operating the inventions of the sixth to eighth aspects of the invention. For example, in a method of operating the position input device of the sixth aspect, an operation element is moved along a detection face of a sensor portion, and a position detecting unit detects the position of the operation element and the external position indicator on the detection face.

According to the certain aspects, positions can be input merely by sliding an operation element to an arbitrary/selected position, so that position input operations can be easily performed. As a result, operations can be performed quickly and easily utilizing, for example menu screens and GUIs (Graphic User Interfaces), so that equipment having complex functions can be operated by using simple procedures.

In certain aspects of this invention, in particular the sixth to ninth aspects, by opening and closing the lid it is possible to switch between operations using an operation element mounted on the lid, and operations using an external position indicator, so that the user can select the desired operation method to perform operations. Position input operations can easily be performed for various types of equipment, including equipment having complicated functions.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF THE PREFERRED EMBODIMENTS AND PREFERRED METHODS

Figure 1:
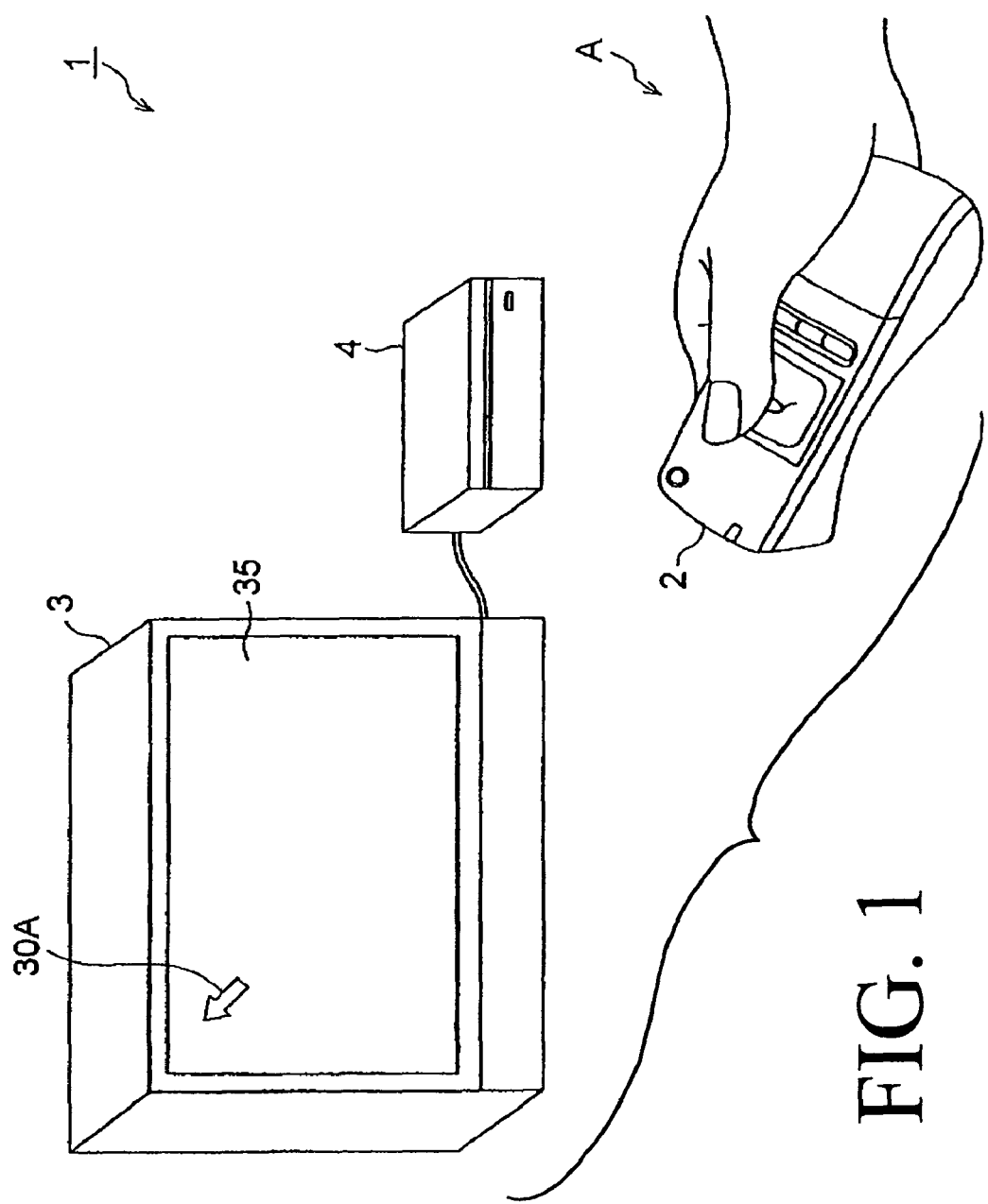
FIG. 1 shows an overview of the configuration of the computer system of a first embodiment of the invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

First Embodiment

FIG. 1 shows an overview of the configuration of a computer system 1 of a first embodiment of the invention.

The computer system 1 in FIG. 1 comprises a remote control device 2, television receiver 3, and computer main unit 4. The remote control device 2 is a remote control device to perform instruction input operations for the computer main unit 4, and is held in the hand and operated by the user as indicated by the symbol A in FIG. 1, to wirelessly transmit signals indicating operation contents to the computer main unit 4.

As explained below, the computer main unit 4 is a computer which receives signals transmitted wirelessly from the remote control device 2 and executes various programs. The computer main unit 4 generates and outputs to the television receiver 3 display signals to display various screens related to programs being executed, and instructions received from the remote control device 2.

The television receiver 3 displays various screens on the display screen 35 based on display signals input from the computer main unit 4. For example, in response to a position input operation of the remote control device 2, a pointer 30A which moves on the screen of the display screen 35 of the television receiver 3 may be displayed. The television receiver 3 incorporates a tuner portion 36 (FIG. 5) connected to an antenna for receiving digital ground wave broadcasts, digital satellite broadcasts, and various other broadcast waves, and for outputting images and audio of the tuned channel.

By operating the remote control device 2, the television receiver 3 can be directly operated. However, for the purposes of this first embodiment, an explanation will be provided in which the computer main unit 4 is operated using the remote control device 2.

Figure 2:
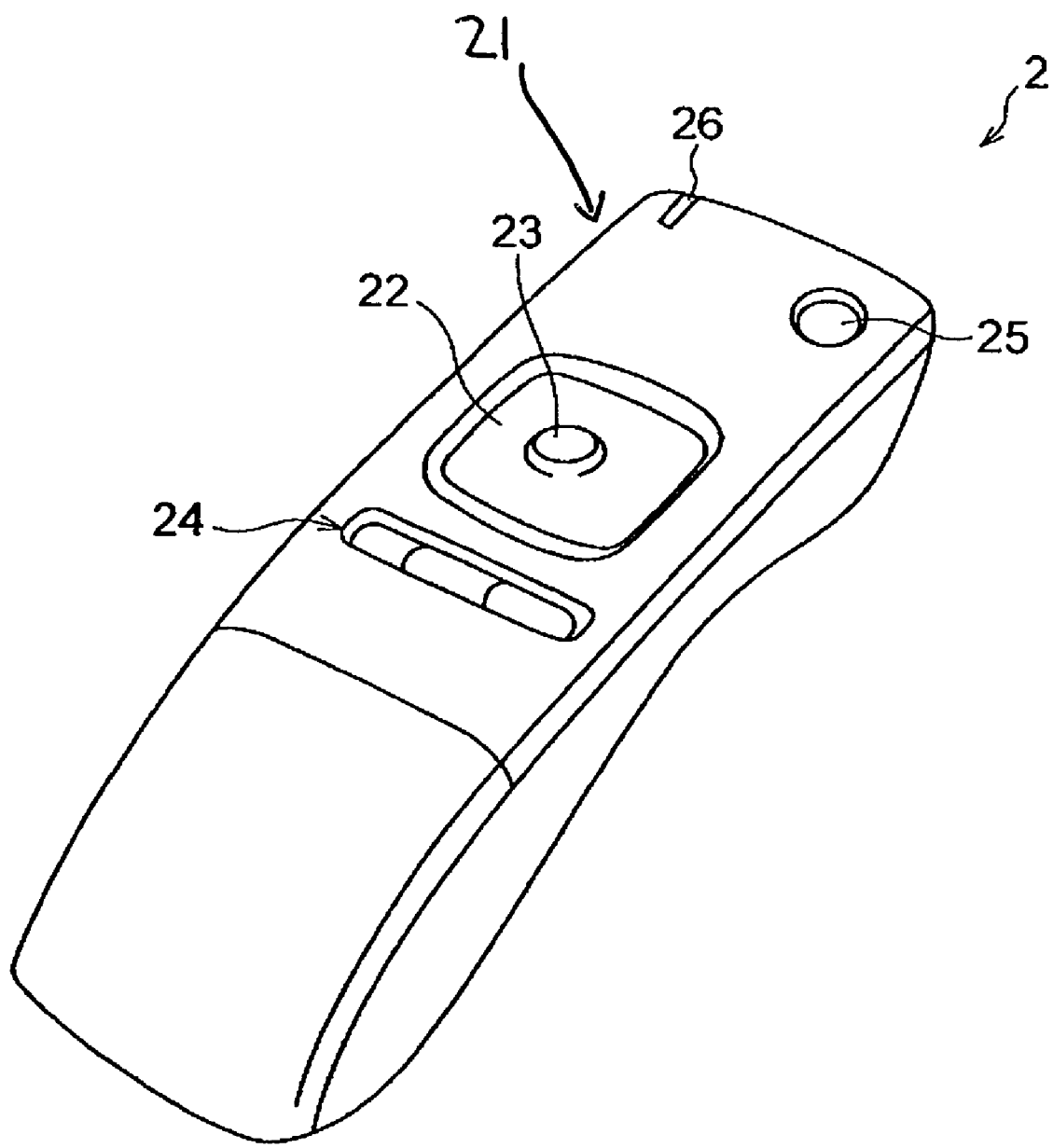
FIG. 2 is an external oblique view showing the configuration of a remote control device.

FIG. 2 is an external oblique view showing the configuration of the remote control device 2.

As shown in FIG. 2, the remote control device 2 has, positioned on the upper face of a remote control device main unit 21, a position input operation portion 22 (position input device), key switch portion 24, power supply switch 25, and LED (Light-Emitting Diode) 26. The position input operation portion 22 is positioned substantially in the center of the upper face of the remote control device main unit 21, and has an operation protuberance 23. The operation protuberance 23 is for example operated by the user with a thumb when held in the user's hand as indicated by the symbol A in FIG. 1.

In the position input operation portion 22, a substantially rectangular hole is provided in the upper face of the remote control device main unit 21, and the operation protuberance 23 protrudes from this hole. The operation protuberance 23 can move in the plane within this substantially rectangular hole.

The key switch portion 24 is shown comprising a plurality of switches, although it should be understood that only a single switch may be provided. The power supply switch 25 specifies the on or off state of the power supply for the equipment which is operated by the remote control device 2. The LED 26 functions as an indicator of the operating state of the remote control device 2, and for example is lit during operation of the remote control device 2, but is extinguished when the remote control device 2 has not been operated for a fixed length of time.

Figure 3:
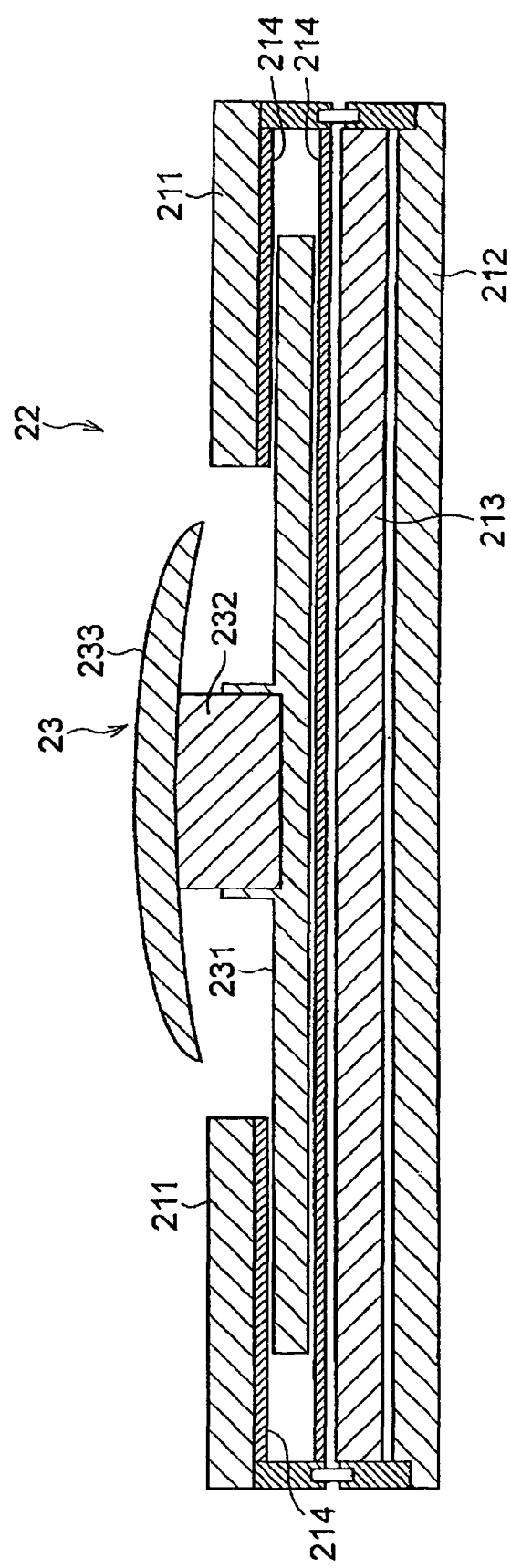
FIG. 3 is a cross-sectional view of principal portions of a position input operation portion of a remote control device.
Figure 4:
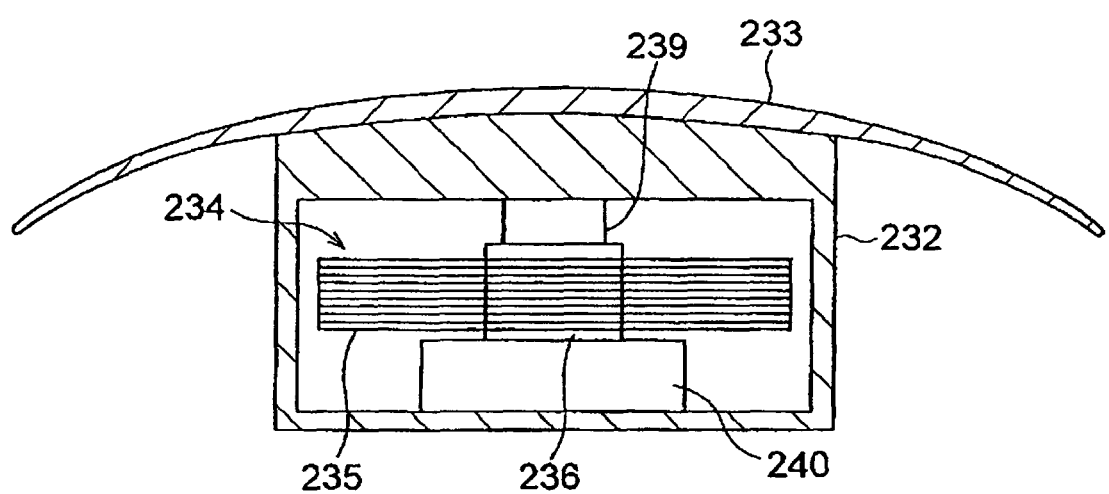
FIG. 4 is a cross-sectional view of principal portions of an operation protuberance in a position input operation portion.

FIG. 3 is a cross-sectional view of the position input operation portion 22. FIG. 4 shows in detail a cross-section of the operation protuberance 23.

As shown in FIG. 3, the position input operation portion 22 comprises a sensor base 213 (sensing or sensor portion), enclosed between a surface plate 211 and a rear plate 212 forming the outer casing of the remote control device main unit 21; a flat pedestal 231 (plate portion), placed above the sensor base 213; and an operation protuberance 23 (operation protuberance portion), which is positioned erect on the flat pedestal 231.

In the sensor base 213 there are provided loop coil groups 241, 242 (FIG. 6), described below. The sensor base 213 is fixed to the rear plate 212.

The flat pedestal 231 is placed so as to be enclosed between the sensor base 213 and the rear face of the surface plate 211. The size of the flat pedestal 231 is larger than the substantially rectangular hole provided in the upper face of the remote control device main unit 21, and smaller than the sensor base 213. Consequently, the flat pedestal 231 can be moved in arbitrary directions (that is, preferably all directions, e.g., up, down, right, left, diagonally, etc.) along the face of the sensor base 213, that is, in a plane parallel to the plane in which the sensor base 213 lies. Moreover, the flat pedestal cannot be removed from the substantially rectangular hole provided in the upper face of the remote control device main unit 21.

The flat pedestal 231 is configured to enable arbitrary movement in horizontal directions in a plane parallel to the sensor base 213, in the space formed between the surface plate 211 and the sensor base 213. A frictional material 214 (friction layer) is affixed at the interface at which the flat pedestal 231 and the sensor base 213 face one another. Another frictional material 214 is affixed at the interface at which the flat pedestal 231 and the rear face of the surface plate 211 face one another. The friction material 214 is a sheet- or plate-shaped member, formed from a material having a prescribed coefficient of friction. When the flat pedestal 231 is moved in a horizontal direction, an appropriate friction is generated at the friction material 214, so as to advantageously provide an enhanced sense of stability in operations to the user when moving the operation protuberance 23.

The planar shapes of the sensor base 213 and the flat pedestal 231 are arbitrary. Various shapes, such as a circular shape, elliptical shape, rectangular shape, or others may be selected for the sensor base 213 and the flat pedestal 231.

The operation protuberance 23 comprises a substantially columnar shaft portion 232 which is erect on the flat pedestal 231, and a contact face 233 provided so as to cover the upper face of the shaft portion 232. The contact face 233 is formed as a curved surface, convex upwards, and the user's thumb makes contact with this contact face 233, for example as indicated by the symbol A in FIG. 1. It should be understood that alternative shapes may be selected for contact face 233.

FIG. 4 is an enlarged, more detailed cross-sectional view of the operation protuberance 23, and in particular a cross-section of the shaft portion 232 and contact face 233.

As shown in FIG. 4, a space (or cavity) is provided in the shaft portion 232 of the operation protuberance 23, and in this space are a tact switch 240, and a ferrite core 236 stacked on the tack switch 240. The upper end of the ferrite core 236 abuts a spacer 239, which extends to the upper end of the space (cavity). The tact switch 240 operates as an on-off switch for operation protuberance 23. The on-off operations are described below.

The tact switch 240 is turned on upon being bent and deformed by a prescribed downward pressure, and which returns to the original state when the pressure is removed. The tact switch 240 is enclosed between the top and bottom faces in the space within the shaft portion 23, with the spacer 239 and ferrite core 236 interposed between the upper surface of the tact switch 240 and the upper end of the space (cavity). Hence when the contact face 233 is pressed, pressure is transmitted through the spacer 239 and the ferrite core 236 and thereby applied to the tact switch 240, which is turned on. In response to the pressure, the tact switch 240 bends with a clicking action, so that a clicking sensation is felt by the hand of the user operating the contact face 233. The tact switch 240 may be designed either to turn off when the pressure 233 is removed from the contact face 233, or to remain on until the contact face 233 is pressed again.

Here, if the material forming the shaft portion 232 has sufficient elasticity to undergo bending upon application of the prescribed pressure, then by pressing the operation protuberance 23 the tact switch 240 can be reliably turned on.

A coil 235 is wound around the periphery of the substantially columnar-shaped ferrite core 236. A capacitor 237 (FIG. 6) is connected in parallel with the coil 235, and an IC 238 (FIG. 6) is further connected. The capacitor 237 and the IC 238 are, for example, mounted on a board (not shown) placed in the space within the shaft portion 232. The coil 235, capacitor 237 and IC 238 collectively form an operation-side circuit 234.

As shown in FIG. 4, the operation-side circuit 234 is incorporated into the operation protuberance 23. The operation-side circuit 234 undergoes an electromagnetic induction action, described below, with the loop coil groups 241, 242 provided in the sensor base 213 (FIG. 3). Based on this electromagnetic induction action, the position of the operation-side circuit 234 on the sensor base 213 is detected. That is, in the position input operation portion 22, the position of the operation protuberance 23 with respect to the sensor base 213 can be detected.

The operation protuberance 23 stands erect within the substantially rectangular hole provided in the surface plate 211 as shown in FIG. 2. On the inside of this hole, the operation protuberance 23 is slidable together with the flat pedestal 231. Hence, a user operating the remote control device 2 can perform position input operations by sliding the operation protuberance 23 to a selected position.

Figure 5:
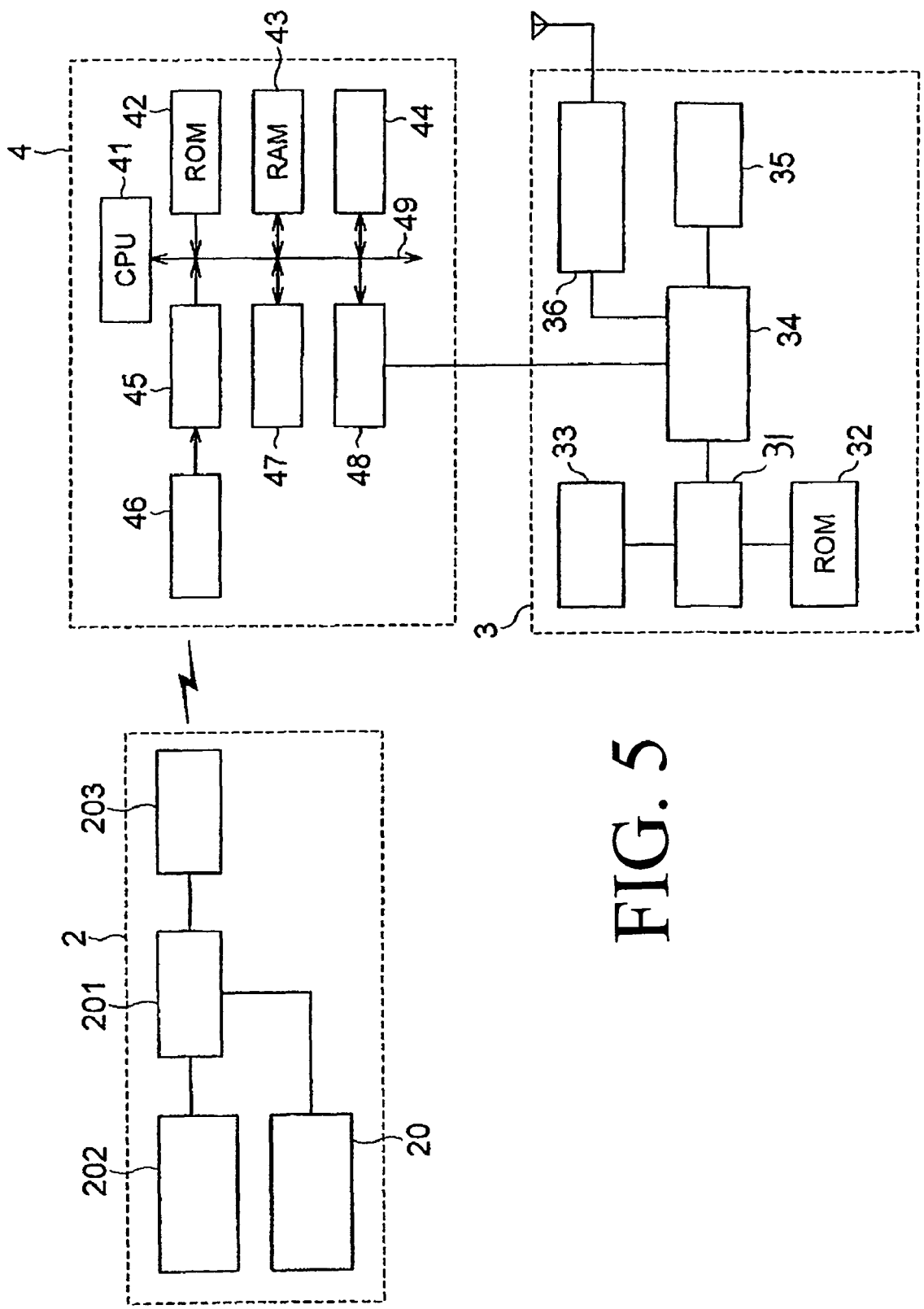
FIG. 5 is a block diagram showing the functional configuration of a computer system.

FIG. 5 is a block diagram showing the functional configuration and interrelationship of the remote control device 2, television receiver 3, and computer main unit 4 of the computer system 1.

As shown in FIG. 5, the remote control device 2 comprises a key operation detection portion 202, which detects operation of switches on the key switch portion 24; a position detection circuit 20 (position detection unit), which detects position input operations in the position input operation portion 22; a control portion 201, which generates and encodes operation signals corresponding to operations detected by the key operation detection portion 202 and position detection circuit 20, and outputs the encoded signals to a light-emitting portion 203 (wireless transmission unit) to cause emission of light; and the light-emitting portion 203, comprising a red LED or similar source which emits light according to signals input from the control portion 201.

The circuit configuration of the position detection circuit 20 of the remote control device 2 will now be explained in detail with reference to FIG. 6.

Figure 6:
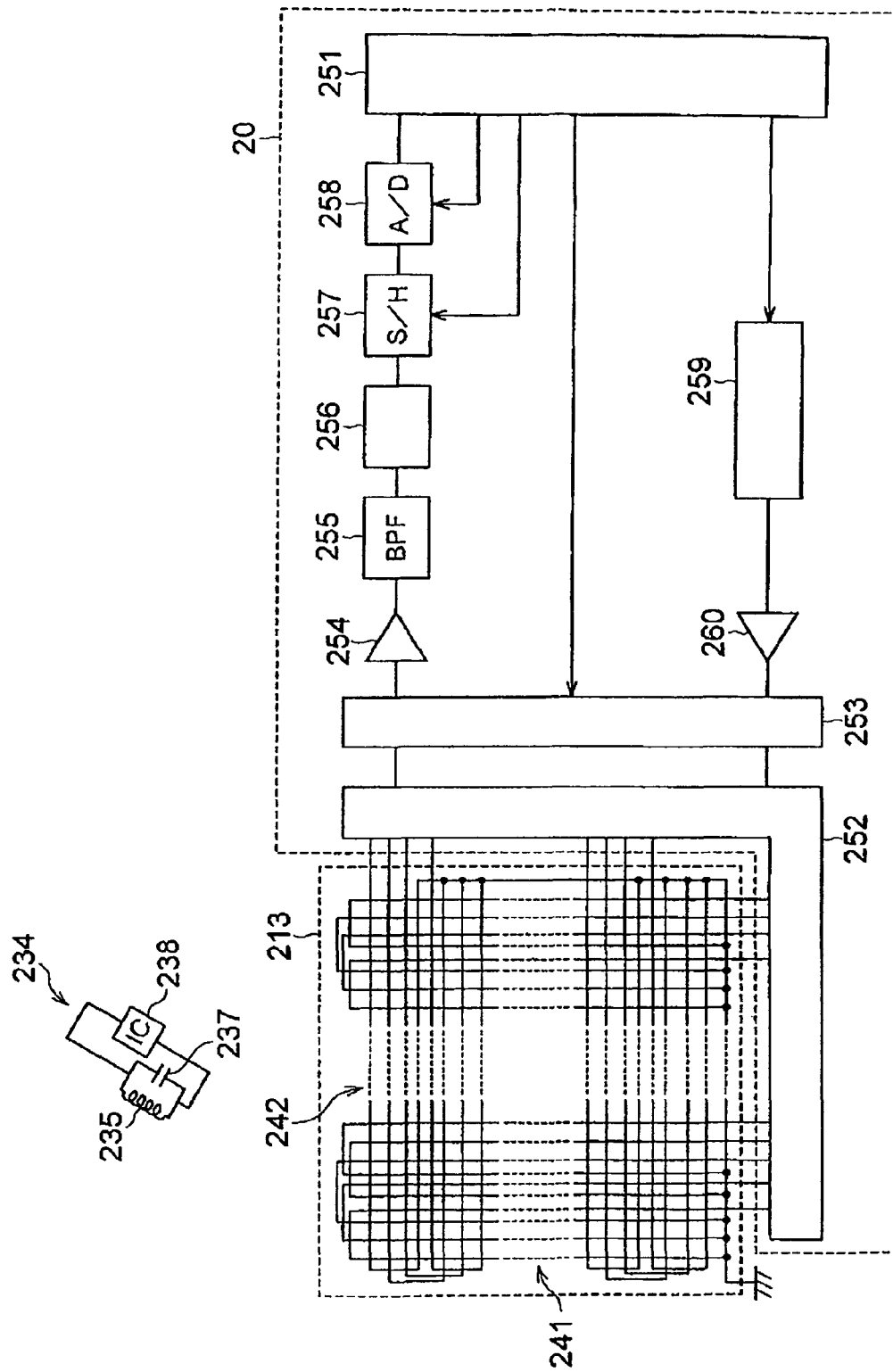
FIG. 6 shows the configuration of a position detection circuit having a remote control device.

FIG. 6 shows in detail the configuration of the position detection circuit 20. FIG. 6 illustrates the loop coil groups 241, 242 positioned in the sensor base 213 (FIG. 3), and the operation-side circuit 234 incorporated into the operation protuberance 23 (FIG. 4).

The position detection circuit 20 is connected to the loop coil groups 241, 242 positioned in the sensor base 213.

In the sensor base 213, a virtual X-Y orthogonal coordinate system comprising an X axis and a Y axis is set corresponding to the horizontal and vertical directions in the substantially rectangular hole provided in the upper face of the remote control device main unit 21. The loop coil groups 241, 242 are positioned corresponding to this X-Y orthogonal coordinate system.

The loop coil group 241 comprises a plurality of loop coils extending in the Y direction and arranged adjacent to one another along the X direction. The loop coil group 242 comprises a plurality of loop coils extending in the X direction and arranged adjacent to one another along the Y direction. Each of the loop coils in the loop coil groups 241, 242 is a conductor coil with one or a plurality of turns, and is for example positioned in the sensor base 213 (FIG. 3) by etching or another method.

The position detection circuit 20 comprises a selection circuit 252, which selects one loop coil from among the loop coil groups 241 and 242. The position detection circuit 20 further comprises a transmit/receive switching circuit 253, which switches between a transmission mode for transmitting oscillation signals to the loop coil selected by the selection circuit 252, and a reception mode for receiving signals from the loop coil selected by the selection circuit 252.

The position detection circuit 20 further comprises a control circuit 251, which controls each of the portions of the position detection circuit 20; an amplification circuit 254, which amplifies signals output from the transmit/receive circuit 253; a BPF (band-pass filter) 255, which passes only the signal component of the signal amplified by the amplification circuit 254 in a prescribed frequency band; a detection circuit 256, which converts the signal component passed by the BPF 255 into a voltage value; a sample/hold circuit 257, which holds the voltage value for a prescribed time; an A/D conversion circuit 258, which converts the voltage value held by the sample-hold circuit 257 into digital data and outputs the digital data to the control circuit 251; a signal generation circuit 259, which generates an oscillation signal at a prescribed frequency under control of the control circuit 251; and an amplification circuit 260, which amplifies the oscillation signal generated by the signal generation circuit 259, and outputs the signal to the transmit/receive switching circuit 253.

Further, the operation-side circuit 234 incorporated within the operation protuberance 23 of the remote control device 2 comprises a coil 235, a capacitor 237 connected in parallel with the coil 235, and an IC 238 connected to the coil 235 and capacitor 237, as shown in FIG. 6.

The position detection circuit 20 permits for the detection of position input operations in the position input operation portion 22 as follows.

The control circuit 251 controls the selection circuit 252 to cause the selection of one loop coil among the loop coil groups 241, 242, and controls the transmit/receive switching circuit 253 to switch the operating mode into a transmission mode.

Next, the control circuit 251 controls the signal generation circuit 259 to generate an oscillation signal at a prescribed frequency. The oscillation signal is amplified by the amplification circuit 260 and input via the transmit/receive switching circuit 253 to the selection circuit 252. The amplified oscillation signal is transmitted from the coil selected by the selection circuit 252 to the operation-side circuit 234 of the operation protuberance 23.

In the operation-side circuit 234, a current is induced in the coil 235 by the oscillation signal transmitted from the loop coil in the sensor base 213, so that operation of the IC 238 is started. The IC 238 generates an oscillation signal of prescribed frequency in the coil 235 and capacitor 237, and this oscillation signal is transmitted from the coil 235 to the sensor base 213.

After continuing operation in the above transmission mode for a prescribed time, the control circuit 251 of the position detection circuit 20 controls the transmit/receive circuit 253 to switch the operating mode into a reception mode. By switching modes, the oscillation signal from the signal generation circuit 259 is no longer output to the selection circuit 252.

In the reception mode, the oscillation signal transmitted from the coil 235 by operation of the IC 238 is received by the loop coil selected by the selection circuit 252, and after amplification by the amplification circuit 254, only the component in a prescribed frequency band is output by the BPF 255 to the detection circuit 256. This signal component is converted into a voltage value by the detection circuit 256, and the voltage value is held by the sample/hold circuit 257. The voltage value held by the sample/hold circuit 257 is converted into digital data by the A/D conversion circuit 258 at each prescribed time interval, and the result is output to the control circuit 251.

Then, while causing successive loop coils in the loop coil groups 241, 242 to be selected by the selection circuit 252, the control circuit 251 performs computation processing of the digital data input from the A/D conversion circuit 258, to identify the loop coil closest to the operation protuberance 23, and determines the coordinates of the indicated position.

While the induced current is flowing in the coil 235, the IC 238 detects the operation state (on/off) of the tact switch 240 (FIG. 4), and changes the transmission timing and transmission time of the oscillation signal to the coil 235 and capacitor 237 according to this operation state. This change in the transmission timing and transmission time is reflected in the digital data resulting from conversion by the A/D conversion circuit 258 of the voltage value held by the sample/hold circuit 257. By computation processing of the digital data input from the A/D conversion circuit 258, the control circuit 251 acquires the operation state of the tact switch 240.

Then, the control circuit 251 generates an operation signal indicating the position of the operation protuberance 23 relative to the sensor base 213 and the operation state of the tact switch 240, and outputs the signal to the control portion 201 (FIG. 5). The position of the operation protuberance 23 relative to the position input operation portion 22 is detected by the position detection circuit 20 of the remote control device 2, and a signal corresponding to this position is input to the light-emitting portion 203.

The position detection circuit 20, by identifying the loop coil closest to the operation protuberance 23 among the loop coil groups 241, 242 placed in the sensor base 213, detects the position of the operation protuberance 23. The position detection circuit 20 can output the position of the operation protuberance 23 to the control portion 201 as an absolute position in the region in which the loop coil groups 241, 242 are placed.

The schematic representation of the television receiver 3 shown in FIG. 5 comprises, in addition to the above-described display screen 35, a control portion 31, which executes control of images displayed on the display screen 35 and the like; ROM 32, which stores data and various programs executed by the control portion 31; a light-receiving portion 33, which receives an infrared signal transmitted from the remote control device 2 or from another infrared remote control device (not shown), decodes the signal, and outputs the signal to the control portion 31; an image signal generation portion 34, which outputs image signals to the display screen 35 under control of the control portion 31; and a tuner portion 36, which generates image signals based on broadcast signals input from an externally connected antenna.

The control portion 31 reads and executes programs and data stored in the ROM 32, and based on the signal input from the light-receiving portion 33, controls the image signal generation portion 34 to cause display of a prescribed image on the display screen 35. When for example the signal input from the light-receiving portion 33 is a signal instructing channel switching, the control portion 31 controls the image signal generation portion 34 to generate image signals from broadcast signals for the specified channel, and causes the signals to be displayed on the display screen 35. As another example, when the signal input from the light-receiving portion 33 is a signal instructing display of a menu screen, display information to display the menu screen is output to the image signal generation portion 34, and a menu screen, comprising menu items (not shown) or icons (not shown), is caused to be displayed on the display screen 35. When the menu screen is displayed on the display screen 35 and a signal corresponding to an operation on the menu screen (selection of an item on the menu screen or another operation) is input from the light-receiving portion 33, the control portion 31 causes a new menu screen corresponding to this operation to be displayed, or executes an operation to display the image of a specified channel, or causes another similar operation.

When a signal to display a screen from the computer main unit 4 is input, the image signal generation portion 34 generates, and outputs to the display screen 35, display information based on this signal. In this manner, the image signal generation portion 34 causes the screen of the computer main unit 4 to be displayed on the display screen 35.

The computer main unit 4 comprises a CPU (Central Processing Unit) 41 (control unit), which controls each of the portions of the computer main unit 4 by executing various control programs; a ROM (Read-Only Memory) 42, which stores control programs executed by the CPU 41 and performs other similar operations; RAM (Random Access Memory) 43, which forms a work area for temporary storage of programs executed by the CPU 41, data and the like; and, a storage portion 44, which stores control programs and application program executed by the CPU 41, as well as data related to these programs.

The computer main unit 4 further comprises a light-receiving portion 46 (reception unit), which receives and decodes infrared light emitted from the light-emitting portion 203 of the remote control device 2, and generates an operation signal indicating the operation content in the remote control device 2; an input portion 45, which acquires and outputs the operation signal generated by the light-receiving portion 46 to the CPU 41; an I/F portion 47, which can be connected to various equipment (not shown) external to the computer main unit 4 as well as to communication circuits and similar devices and circuits; and a display portion 48 (display unit) which analyzes data for the screen display generated by the CPU 41, generates signals to display a screen, and outputs the signals to the television receiver 3. The above units and portions 41-48 are interconnected by a bus 49.

The CPU 41, by reading and executing a basic control program stored in ROM 42, controls each of the portions of the computer main unit 4, and in addition reads, expands into a work area in RAM 43, and executes application programs stored in the storage portion 44, to perform various data processing operations. During execution of the basic control program and an application program, the CPU 41 generates data for screen display in order to display screens related to the programs, outputs the data to the display portion 48, and causes the television receiver 3 to display screens.

When an operation signal indicating a position detected by the position detection circuit 20 of the remote control device 2 is input from the input portion 45, the CPU 41 determines the content of the instruction specified by the position input operation based on this operation information and screen display data output to the display portion 48, and performs operations corresponding to the instruction content.

Further, when an operation signal indicating an operation state of a key switch 24 of the remote control device 2 is input from the input portion 45, the CPU 41 determines the instruction content indicated by operation of the key switch portion 24, and performs operations corresponding to the instruction content.

In this manner, the remote control device 2 can be used to perform position input operations for the computer main unit 4. During operation of the computer main unit 4, screens relating to an application program being executed by the computer main unit 4 are displayed on the display screen 35 of the television receiver 3. Various menu screens and GUI screens are displayed on the display screen 35, and in addition a pointer 30A such as the example shown in FIG. 1 is displayed. By moving the pointer 30A to an arbitrary/selected position, and by further operating a switch or the like, menu selections, operations to select GUI icons, and similar tasks can be performed. In effect, operations can be performed to specify substantially all the functions of the computer main unit 4.

In the position input operation portion 22 of the remote control device 2, by moving the operation protuberance 23 to an arbitrary position, a signal indicating the position of the operation protuberance 23 is transmitted from the remote control device 2 to the computer main unit 4. Further, when a switch of the key switch portion 24 is operated, a signal indicating this operation state is transmitted from the remote control device 2 to the computer main unit 4. Operations on the menu screens and GUI displayed on the display screen 35 by the computer main unit 4 can be performed by operating the position input operation portion 22 and key switch portion 24 of the remote control device 2.

In the position input operation portion 22 of the remote control device 2, the sensor base 213 having loop coil groups 241, 242 and the flat pedestal 231 are stacked and positioned between the surface plate 211 and rear plate 212 which form the remote control device main unit 21. The flat pedestal 231 can slide along the face of the sensor base 213. The operation-side circuit 234 is incorporated within the operation protuberance 23 which is erect on the flat pedestal 231. As a result of the electromagnetic induction action between this operation-side circuit 234 and the loop coil groups 241, 242, the position of the operation protuberance 23 is detected. Hence the user, holding the remote control device 2 in a hand as indicated by the symbol A in FIG. 1, can for example use his thumb to simply slide the operation protuberance 23, to move the pointer 30A to an arbitrary/selected position. This operation can be performed on the remote control device 2 with one hand, so that actions which are generally taken when viewing a program on a television receiver can be performed even when in a relaxed posture, and the operability of the computer main unit 4 is greatly improved.

Further, the position of the operation protuberance 23 during operation of the remote control device 2 can be detected as an absolute position in the region in which the loop coil groups 241, 242 are placed. That is, the detected position does not depend on a substantial amount of movement of the operation protuberance 23, and so even if the region in which the operation protuberance 23 can move is limited, the pointer 30A can be moved to an arbitrary/selected position on the display screen 35. Hence even if the range of movement of the operation protuberance 23 is limited, comfortable operation is possible. Even when the remote control device 2 is compact, comfortable operation can be realized without problems. In addition, position detection can be performed regardless of the speed of movement of the operation protuberance 23, so that responsiveness to operations of moving the protuberance 23 is extremely good.

In the above first embodiment, the operation-side circuit 234 is incorporated within the operation protuberance 23, and the loop coil groups 241, 242 are placed in the sensor base 213 positioned therebelow. The invention is not limited to this configuration, and for example the loop coil groups 241, 242 may be provided elsewhere, such as in the flat pedestal 231, and each of the portions forming the operation-side circuit 234 may be provided, elsewhere, such as in the sensor base 213. In this case, the position of coil 235 provided on the side of the sensor base 213 is detected on the side of the flat pedestal 231. However, because the position of the operation protuberance 23 can easily be determined with reference to the position of the coil 235, advantageous results similar to those of the configuration explained above in the first embodiment are obtained.

In this first embodiment, an example was explained of a remote control device used to operate a computer main unit connected to a television receiver. The invention is not limited to such a configuration, and for example the invention may be applied to a remote control device which controls a personal computer not attached to a television receiver. Further, the invention may also be applied to a remote control device used to operate a television receiver itself without requiring the computer.

Further, in the above description the remote control device 2 transmits signals to the computer main unit 4 by emitting infrared light from the light-emitting portion 203. The invention is not limited to such a configuration. For example, the remote control device 2 may transmit signals using wireless communication methods conforming to the IEEE (Institute of Electrical and Electronic Engineers) 802.11 standard or to the Bluetooth standard, or other wireless communication methods which can be used over comparatively short distances.

Second Embodiment

Figure 7:
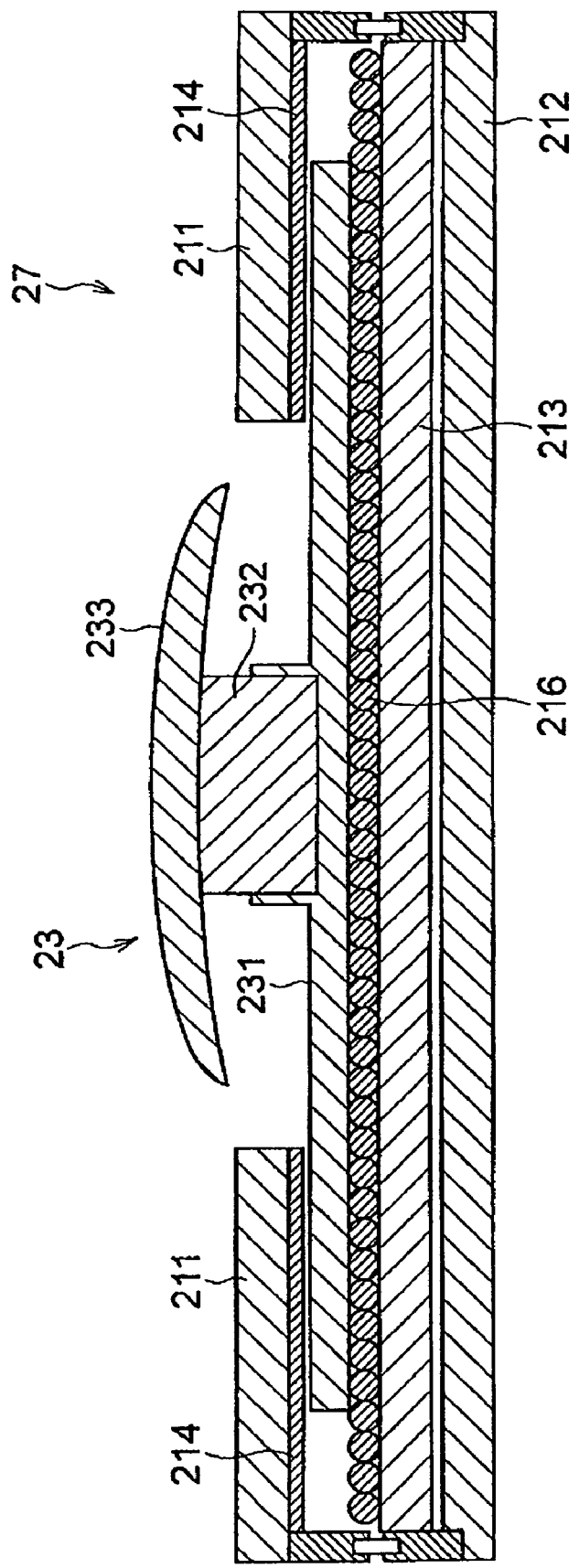
FIG. 7 is a cross-sectional view of principal portions of a position input operation portion of a second embodiment of the invention.

FIG. 7 is a cross-sectional view of principal portions, showing the configuration of the position input operation portion 27 of a remote control device 2 of a second embodiment of the invention.

The remote control device 2 of this second embodiment is configured similarly to the remote control device 2 of the above first embodiment, except for the ball support portion 216, described below. Common constituent portions and parts are assigned the same symbols as used in connection with the first embodiment, and redundant drawings and explanations are omitted below.

The position input operation portion 27 shown in FIG. 7 is a position input device which is used in place of the position input operation portion 22 of the above first embodiment. This position input operation portion 27 is configured with a ball support portion 216 provided, in place of the friction material 214 in the position input operation portion 22, between the sensor base 213 and the flat pedestal 231.

The ball support portion 216 (rolling support portion) has a plurality of arranged spherical members, and the flat pedestal 231, which abuts the sensor base 213 with this ball support portion 216 intervening, can easily and smoothly be slid. Advantageously, subjectively easy operability is achieved, in which the operation protuberance 23 can be moved smoothly with a small force, compared with the above first embodiment.

In this second embodiment, in place of the ball support portion 216, a roller portion in which a plurality of cylindrical members is arranged may instead be provided. In this alternative embodiment containing the intervening cylindrical members, the flat pedestal 231 can be moved smoothly without excessive friction occurring with the sensor base 213, and subjectively easy operability can be achieved.

Third Embodiment

Figure 8:
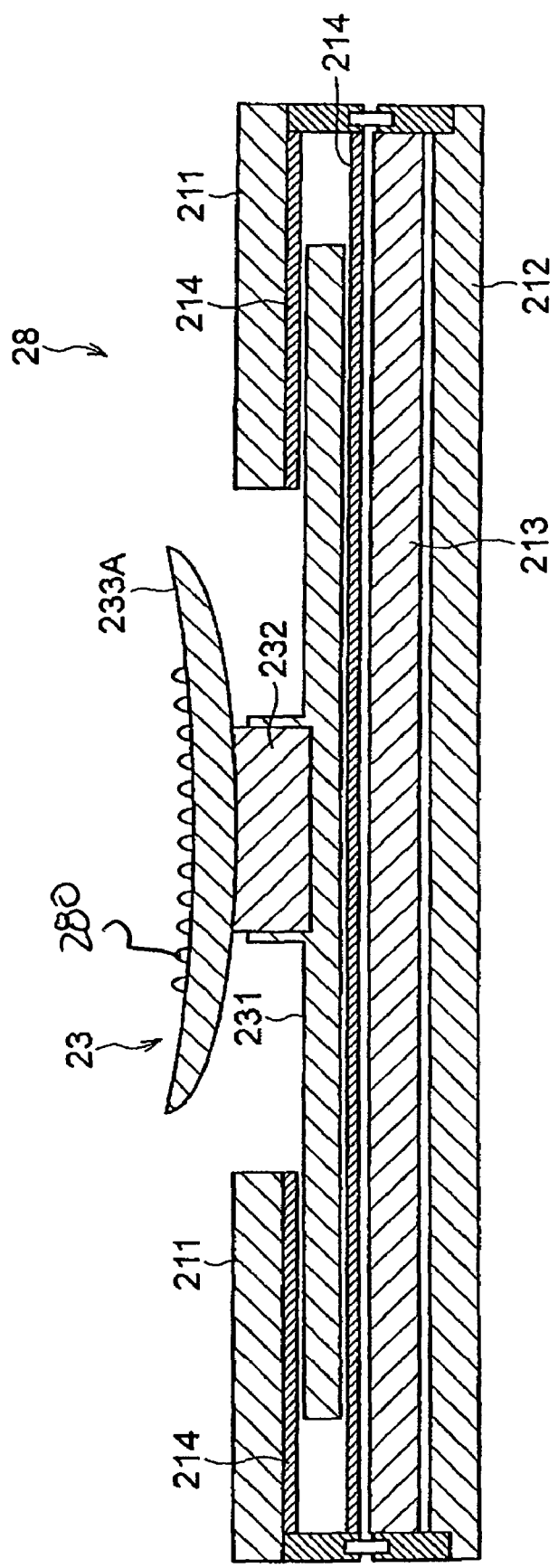
FIG. 8 is a cross-sectional view of principal portions of a position input operation portion of a third embodiment of the invention.

FIG. 8 is a cross-sectional view of principal portions, showing the configuration of the position input operation portion 28 in a remote control device 2 of a third embodiment of the invention.

The remote control device 2 of this third embodiment is configured similarly to the remote control device 2 of the above first embodiment, except for the operation-side circuit 234, described below. Hence, common constituent portions and parts are assigned the same symbols as used above in connection with the first embodiment, and redundant drawings and explanations are omitted below.

The position input operation portion 28 shown in FIG. 8 is a position input device which is used in place of the position input operation portion 22 of the above first embodiment. This position input operation portion 28 is provided with a protuberance contact face 233A in place of the contact face 233. The user touches the protuberance contact face 233A with a finger.

The contact face 233A is provided with a plurality of small protrusions 280 on a curved surface, concave upwards. The protrusions 280 are preferably formed from a pliable material, and the tip portions of the protrusions 280 preferably have curved surfaces so as not to discomfort the user's fingers.

In this configuration, a user's finger in contact with the contact face 233A does not slip easily. Hence compared with the above first embodiment, the operation protuberance 23 can be moved reliably. Also, there is the advantage that because the user's finger does not slip easily, there is an enhanced sense of stability.

Fourth Embodiment

Figure 9:
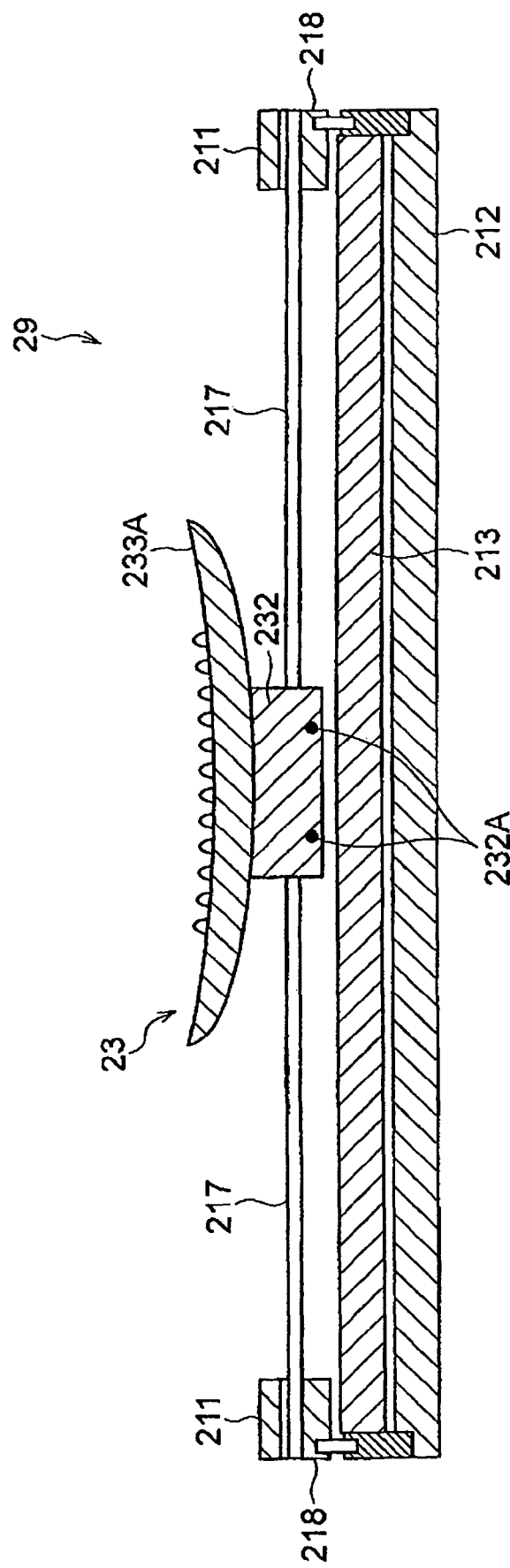
FIG. 9 is a cross-sectional view of principal portions of a position input operation portion of a fourth embodiment of the invention.
Figure 10:
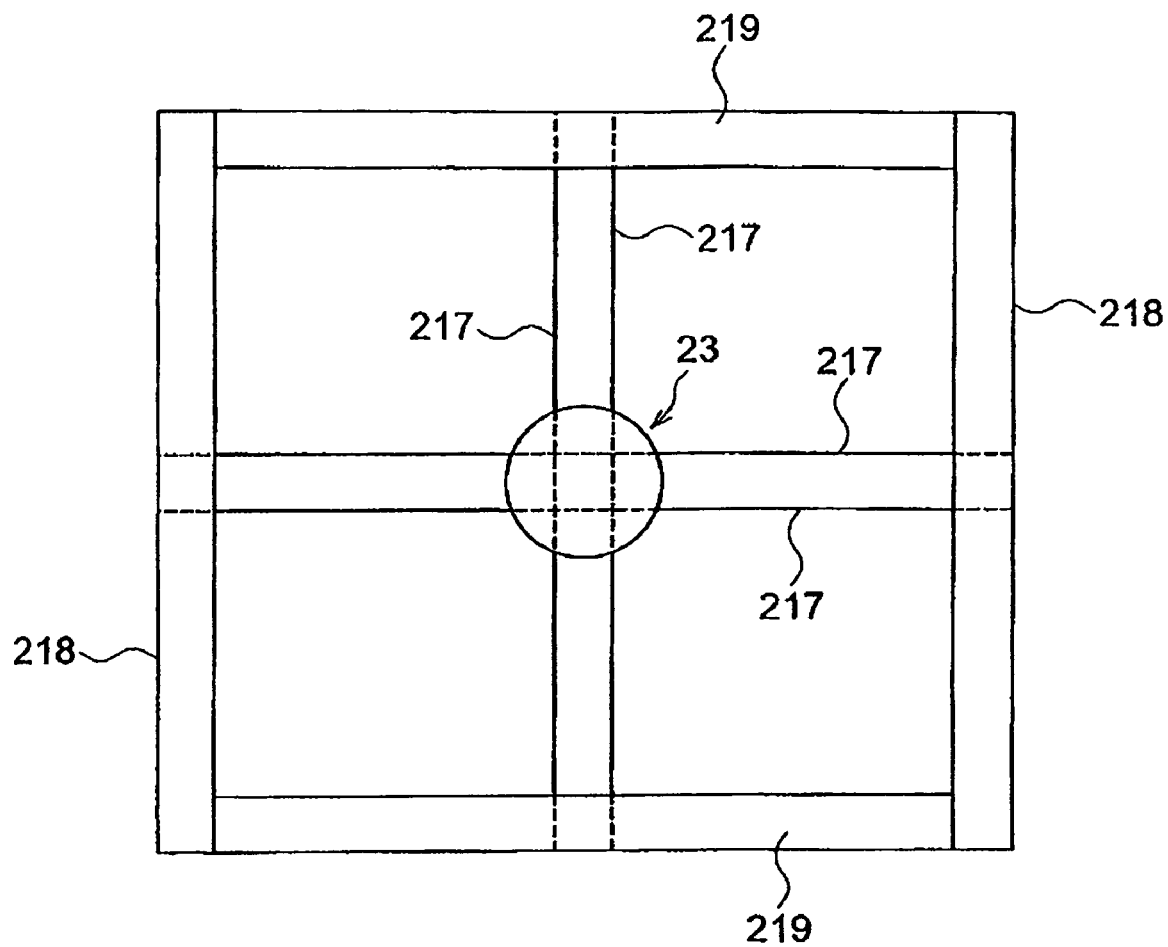
FIG. 10 is a plane view of principal portions, showing the configuration of the position input operation portion of FIG. 9.

FIG. 9 is a cross-sectional view of principal portions, showing the configuration of the position input operation portion 29 of the remote control device 2 of a fourth embodiment of the invention. FIG. 10 is a plane view of principal portions.

The remote control device 2 of this fourth embodiment is configured similarly to the remote control device 2 of the above third embodiment, except for the wires 217, described below; hence common constituent portions are assigned the same symbols, and redundant drawings and explanations are omitted below.

The position input operation portion 29 shown in FIG. 9 and FIG. 10 is a position input device used in place of the position input operation portion 28 of the above third embodiment.

The position input operation portion 29 is not provided with a flat pedestal 231, but is configured such that the operation protuberance 23 is supported by slide support members 218, 219, via wires 217. The wires 217 and slide support members 218, 219 form a support mechanism.

As shown in FIG. 10, the slide support members 218, 219, which are rod-shaped members in which grooves are formed along the length direction, are positioned on the position input operation portion 29.

The slide support members 219 are positioned on both side ends of the position input operation portion 29 along the length direction of the remote control device 2. The slide support members 218 are positioned on the front end and back end of the position input operation portion 29, oriented perpendicular to the slide support members 219. The end portions of adjacent slide support members 218, 219 are joined or connected, or are in contact, so that the two slide support members 218 and the two slide support members 219 establish a stationary square frame surrounding the position input operation portion 29.

The operation protuberance 23 is suspended by the wires 217 on the inside of the frame comprising the slide support members 218, 219. As shown in FIG. 10, two sets of two wires 217, for a total of four wires, are provided in the position input operation portion 29. One set of wires 217 is stretched between the two slide support members 218, and the other set of wires 217 is stretched between the two slide support members 219.

As stated above, grooves are formed in the length directions of the slide support members 218, 219, and the grooves are open toward the inside of the above-described frame. The end portions of the wires 217 are housed in the grooves, and the two sets of wires 217 can move in sliding motion along the slide support members 218 and 219 respectively. Further, the two sets of wires 217 each penetrate penetrating holes 232A formed in the shaft portion 232 of the operation protuberance 23, so that the shaft portion 232 is the point of perpendicular intersection of the two sets of wires 217. The penetrating holes 232A and wires 217 are not fixed; rather, the wires 217 can slide freely through the penetrating holes 232A during movement of operation protuberance 23.

The first set of wires 217 can slide freely with respect to the slide support members 218, and the second set of wires 217 can slide freely with respect to the slide support members 219. Further, the shaft portion 232 can slide freely along the wires 217. Hence the operation protuberance 23 is supported so as to enable free movement along the surface of the sensor base 218, in a first length direction of the slide support members 218 and in a second length direction of the slide support members 219 perpendicular to the first length direction. Hence the operation protuberance 23 can move freely along the surface of the sensor base 218. As the operation protuberance 23 is moved, the wires 217 move along the slide support members 218 or the slide support members 219 while perpendicular wires 217 slide in the penetrating holes 232A, so that there is no impediment whatsoever to the motion of the operation protuberance 23. More specifically, when the operation protuberance 23 is moved along a direction perpendicular to the first of wires 217, the first set of wires 217 will slide along the slide support members 218, while the second set of wires 217 slide through penetrating holes 232A and remain stationary relative to slide support members 219. On the other hand, when operation protuberance 23 is moved along a direction perpendicular to the second set of wires 217, the second set of wires 217 will slide long the slid support members 219, while the first of wires 217 slide through penetrating holes 232A and remain stationary relative to slide support members 218. Diagonal movement of the operation protuberance 23 will cause the first and second sets of wires 217 to slide simultaneously along slide support members 218 and 219, respectively.

The operation protuberance 23 is suspended by the wires 217 at a height which is elevated a prescribed distance from the surface of the sensor base 213, so that no friction occurs between the lower face of the shaft portion 232 and the surface of the sensor base 213. Consequently the operation protuberance 23 can be moved to an arbitrary/selected position easily with application of a small force from finger A.

The fourth embodiment attains advantageous results similar to those of the above first through third embodiments. Further, the position input operation portion 29 has a simple configuration in which the operation protuberance 23 is suspended by wires 217, and the configuration can be realized easily at lower cost.

In the above configuration, the thickness and material of the wires 217 can be modified freely. It is sufficient that there be sufficient stiffness to enable support of the operation protuberance 23 above the sensor base 213 in the state in which there is no user operation. The number of wires is also arbitrary. Further, in place of the wires 217, for example, metal or resin rod members or similar components which act to support the operation protuberance 23 with the slide support members 218, 219 can be used.

This invention is not limited to cases in which a computer main unit 4 is operated remotely, as in the descriptions of the above embodiments, and the position input operation portion 22 may be provided integrally with the equipment to be operated. Such cases are explained as fifth through seventh embodiments.

Fifth Embodiment

Figure 11:
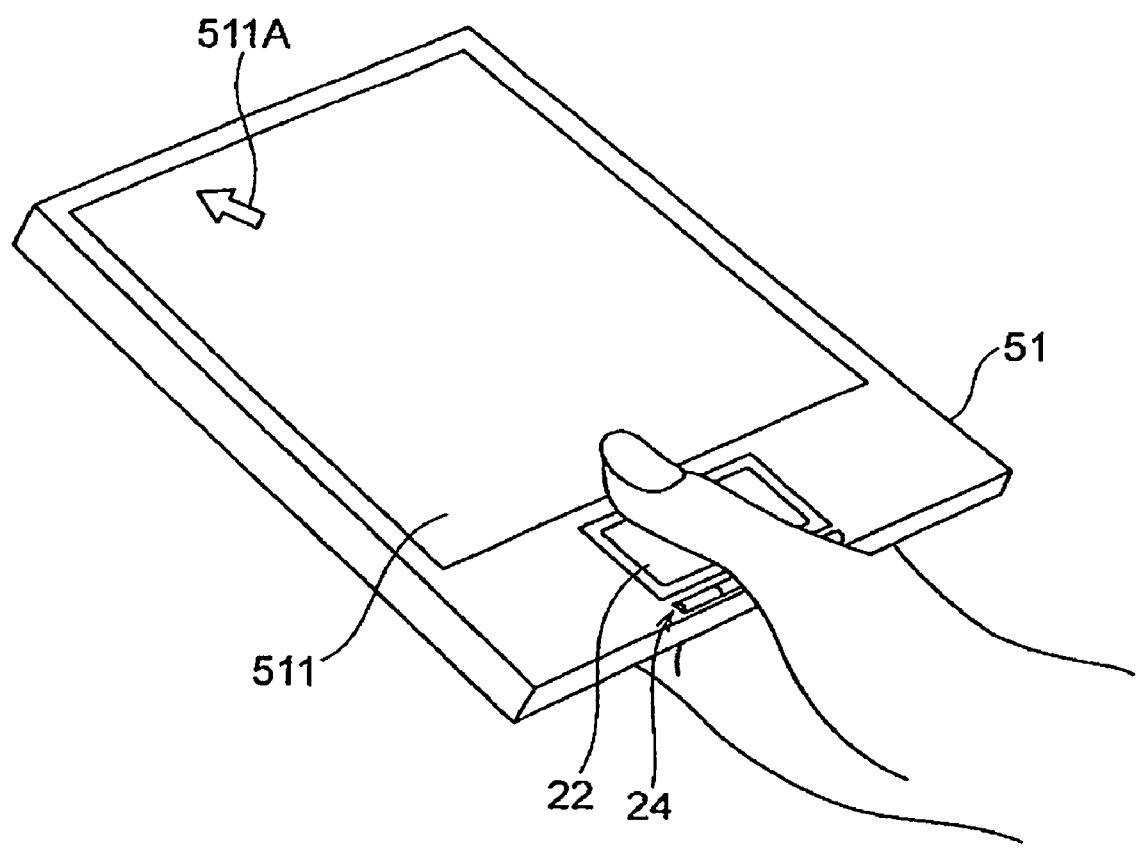
FIG. 11 shows the configuration of portable electronic equipment of a fifth embodiment of the invention.

FIG. 11 shows the configuration of a portable electronic device 51, as electronic equipment of a fifth embodiment of the invention.

The portable electronic device 51 is a portable electronic device called a PDA (Personal Digital Assistant), and is also known by other similar names. Portable electronic devices 51 usually have schedule management functions, communication functions, and various other functions. The portable electronic device 51 has a display screen 511 comprising a liquid crystal display panel or similar display, which displays text, images, and similar information related to the above functions. The portable electronic device 51 comprises a GUI input environment. By performing input to specify the position of a pointer 511A displayed on the display screen 511, instructions can be issued to switch between and execute the above functions.

The portable electronic device 51 has the above-described position input operation portion 22 to enable position input operations. As explained above in the first embodiment, the operation protuberance 23 of this position input operation portion 22 is operated by the user's finger. By moving this operation protuberance 23, position input operations can be performed. Further, the key switch portion 24 is provided adjacent to the position input operation portion 22, and switch operations using this key switch portion 24 can be performed.

Hence using the portable electronic device 51 shown in FIG. 11, position input operations similar to those using the remote control device 2 of the above-described first embodiment can be performed, and moreover switch operations can be performed. When the portable electronic device 51 is configured as a lightweight and compact device, it is desirable that the user be able to operate the device 51 while the device 51 is held in one hand. By providing a position input operation portion 22 in this portable electronic device 51, as shown in FIG. 11, position input operations can be performed using one hand while holding the main unit of the portable electronic device 51 in that hand. As a result, both the user's hands are not occupied during operation of the portable electronic device 51, and so the device can easily be used even when the user is in a standing or sitting position, further enhancing the convenience of the portable electronic device 51.

Sixth Embodiment

Figure 12:
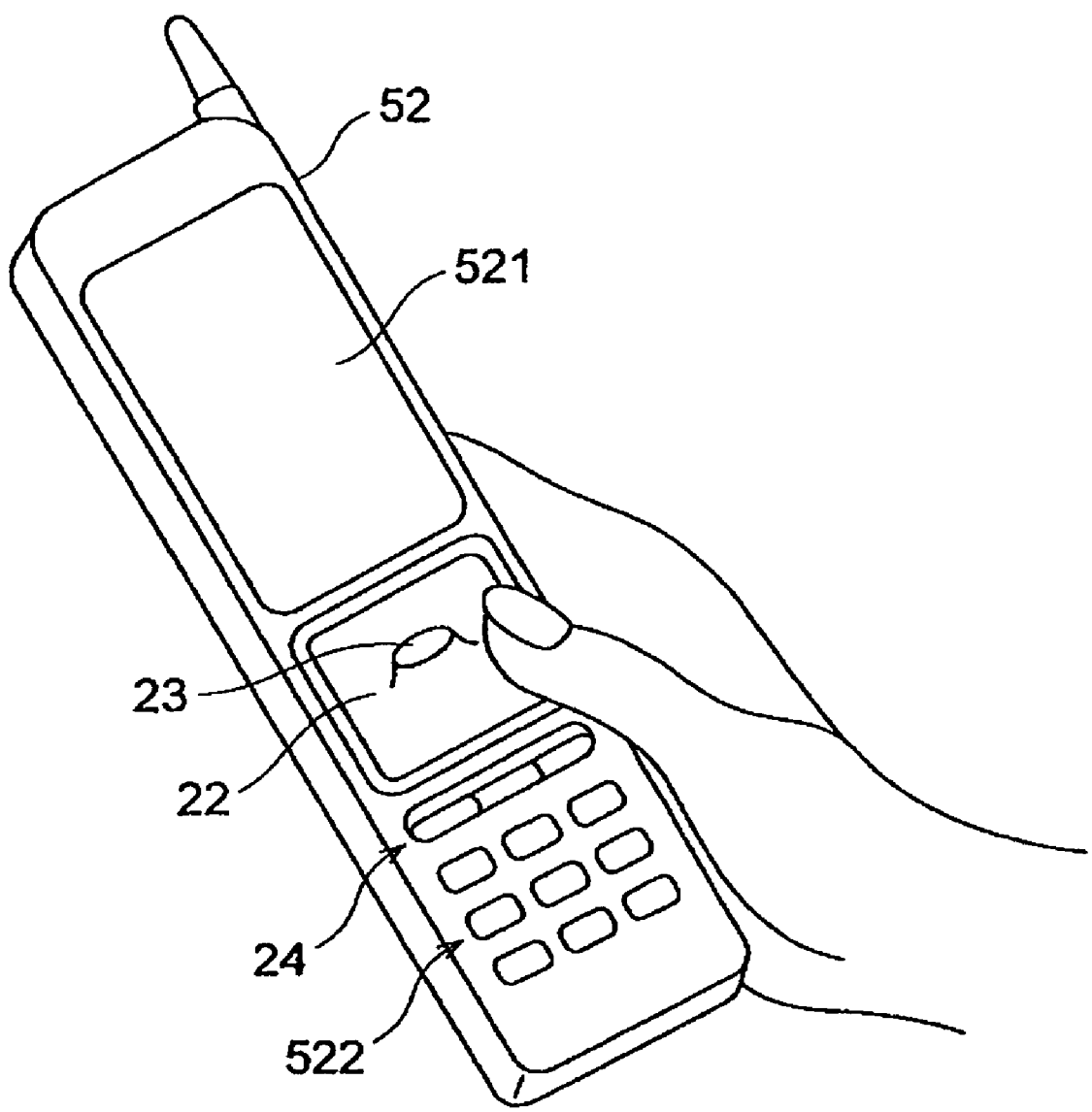
FIG. 12 shows the configuration of the portable telephone set of a sixth embodiment of the invention.

FIG. 12 shows the configuration of a portable telephone set 52, as electronic equipment of a sixth embodiment of the invention.

The portable telephone set 52 is a portable-type telephone set in which, by executing wireless communication with a base station, not shown, a communication circuit with the equipment of the other party of a conversation is established, to enable conversation and similar functions. The portable telephone set 52 comprises a displays screen 521 which displays the telephone number of the other party and similar information, and a key operation portion 522 having various keys, such as for telephone number input operations and to turn the power on and off.

Further, the portable telephone set 52 has a position input operation portion 22 to specify positions in an area displayed on the display screen 521. This position input operation portion 22 comprises an operation protuberance 23 which is operated by a finger of the user, as explained in the above first embodiment. By moving this operation protuberance 23, position input operations can be performed. Further, a key switch portion 24 is provided adjacent to the position input operation portion 22. The key switch portion 24 can be used for switch operations.

The portable telephone set 52 can, in addition to telephone conversation functions, execute address book management functions and various other functions, and comprises a GUI input environment to specify execution of these functions. Menu items and icons (text, images, and similar) relating to various functions, including telephone conversation functions, are displayed on the display screen 521, and the position of a cursor or pointer displayed on the display screen 521 can be specified by performing a position input operation, to switch between or execute the above functions.

A position input operation to specify the position of the cursor or pointer can also be performed by pressing a key of the key operation portion 522, and by moving the operation protuberance 23 on the position input operation portion 22 of the portable telephone set 52. Switch operations of the key switch portion 24 can also be performed in combination with movement operations for the operation protuberance 23 of the portable telephone set 52.

Hence using the portable telephone set 52 shown in FIG. 12, position input operations similar to those using the remote control device 2 of the above-described first embodiment can be performed, and moreover switch operations can be performed. The portable telephone set 52 is normally held in and operated using one hand. Here, the position of the position input operation portion 22 is placed in a range such that, when the user holds the portable telephone set 52 in one hand as shown in FIG. 12, the user can operate the operation protuberance 23 with a finger (or in the example of FIG. 12, the thumb), and also can use that hand to perform position input operations. The user can reliably perform position input operations even when standing or when the user's posture is unstable. Further, when position input operations are performed using keys of the key operation portion 522, keys usually must be pressed a multiple number of times, placing a greater burden on the user's fingers, and moreover rapid operations are difficult. In contrast, when using the portable telephone set 52 of the sixth embodiment, position input operations can be performed merely by moving the operation protuberance 23 on the position input operation portion 22, so that position input operations can be performed extremely quickly and easily, and moreover there is the advantage that the burden on the user's fingers is greatly alleviated.

The portable telephone set 52 has a size and shape enabling portability and possesses, at least, telephone conversation functions and a display screen; the method of communication and similar features are arbitrary. The shape of the housing of the portable telephone set 52 is not limited to a so-called straight type as shown in FIG. 12, but may be a folding type, as well as other designs.

Seventh Embodiment

Figure 13:
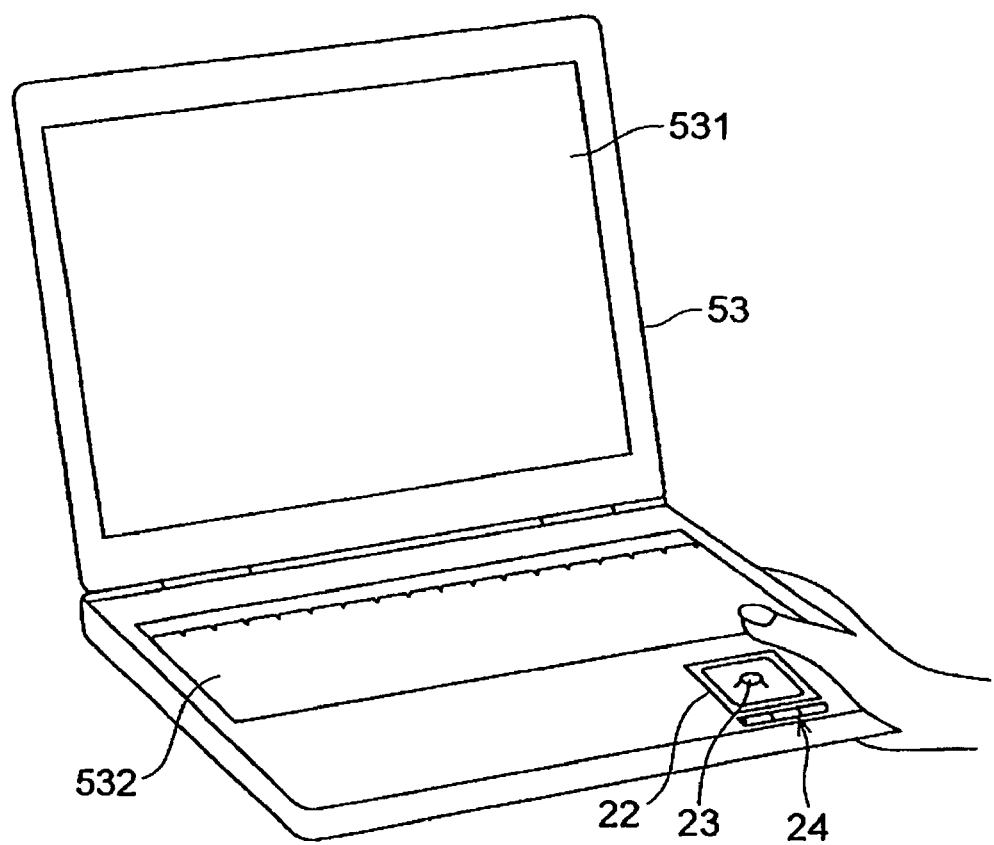
FIG. 13 shows the configuration of the notebook computer of a seventh embodiment of the invention.

FIG. 13 shows the configuration of the notebook computer 53 as electronic equipment of a seventh embodiment of the invention.

The notebook computer 53 is a personal computer configured to enable portability, and incorporates, in the main unit, a CPU, ROM, RAM and other devices mounted on a main board, as well as a hard disk drive and other equipment. In addition, a liquid crystal display panel or other display screen 531 is provided.

The notebook computer 53 is further provided with a keyboard 532 for input operations, a position input operation portion 22, and a key switch portion 24. The keyboard 532 comprises a plurality of keys, and enables input by performing operations to depress these keys.

As explained above in the description of the first embodiment, the position input operation portion 22 comprises an operation protuberance 23 which is operated by the user's finger. By moving this operation protuberance 23, position input operations can be performed. Further, a key switch portion 24 is provided adjacent to the position input operation portion 22. Key operations can be performed using this key switch portion 24.

The notebook computer 53 can execute a variety of functions by executing various application programs, and comprises a GUI input environment to specify execution of these functions. Icons (text, images and similar) relating to the various functions are displayed on the display screen 531. By performing position input operations to specify the position of a cursor or pointer displayed on the display screen 531, instructions can be issued to switch between or execute the above functions. Position input operations to specify the position of the cursor or pointer can be performed using the keyboard 532, but by moving the operation protuberance 23 of the position input operation portion 22 in the notebook computer 53, position input operations can be performed.

As shown in FIG. 13, the position input operation portion 22 is positioned such that, when the housing of the notebook computer 53 is held with one hand, the user's thumb can reach the operation protuberance 23, so that the user, while holding the notebook computer 53 with one hand, can move the operation protuberance 23 with a finger of that hand to perform position input operations. That is, while holding the notebook computer 53 with just one hand, position input operations can be performed. Further, switch operations can also be performed using the key switch portion 24 placed close to the position input operation portion 22, and the position input operation portion 22 can perform position input operations.

Hence the notebook computer enables position input operations while being held with one hand, so that when for example the user is standing or the user's posture is otherwise unstable, reliable operations can nevertheless be performed. Moreover, position input operations can be performed merely by moving the operation protuberance 23 of the position input operation portion 22, so that position input operations can be performed extremely quickly and easily. There is the further advantage that the burden on the user's fingers is alleviated.

Various modifications and applications to the above-described first through seventh embodiments can be freely made within the scope of the invention.

For example, in the above first through seventh embodiments, the position input operation portions 22, 27, 28 and 29 all possess an operation protuberance 23; but this invention is not limited to such a configuration. For example, a configuration may be employed in which an operation-side circuit 234 is incorporated within a flat pedestal 231, and a mark visible to the user is formed on the surface of the flat pedestal 231 exposed on the upper face of the remote control device main unit 21. In this case, an anti-sliding film may be provided on the flat pedestal 231. In this configuration, by performing an operation to move the mark on the flat pedestal 231 to an arbitrary/selected position, a position input operation can be performed, and advantageous results similar to those of the above embodiments are obtained. The shape and height of the operation protuberance 23 are arbitrary.

Further, in each of the above embodiments a configuration is employed in which the position of the operation protuberance 23 is detected based on the electromagnetic action between a coil 235 of an operation-side circuit 234, and loop coil groups 241, 242 placed in the sensor base 213. The invention is not limited to such configurations, and for example the position of the operation protuberance 23 may be detected via a static capacitance method. For example, a conductive element is provided either on the lower face of or within the flat pedestal 231 at a specific position, and a plurality of mutually insulated conductive lines are arranged in the sensor base 213, so that by detecting the change in static capacitance between these conductive lines, the position of the operation protuberance 23 can be detected. In this case, the conductive element protrudes as a narrow protrusion from the lower face of the operation protuberance 23, that is, from the face opposing the sensor base 213, and if the protruding conductive element makes contact with the sensor base 213, the position of the conductive element on the sensor base 213 is detected, so that high-precision position input operations can be performed.

Here, the conductive element need not be exposed, but may be covered with a resin or other material.

Further, by eliminating the operation-side circuit 234 incorporated within the operation protuberance 23 and providing on the sensor base 213 a resistive film or the like, the electrical resistance value of which changes with applied pressure, depression operations performed on the sensor base 213 can be detected. In this case, when an operation is performed to press on the operation protuberance 23, the position at which the depression operation was performed can be detected in the sensor base 213. Further, a fine protrusion is provided in the lower face of the operation protuberance 23, that is, in the face opposing the sensor base 213. By depressing the sensor base 213 by application of force to the tip of this protrusion, the position of the tip of the protrusion in the sensor base 213 is detected, so that highly precise position input operations can be performed.

In all of these cases also, advantageous results similar to those of the above embodiments can be obtained, with respect to the ability of the user to perform position input operations with a single hand.

Eighth Embodiment

Figure 14:
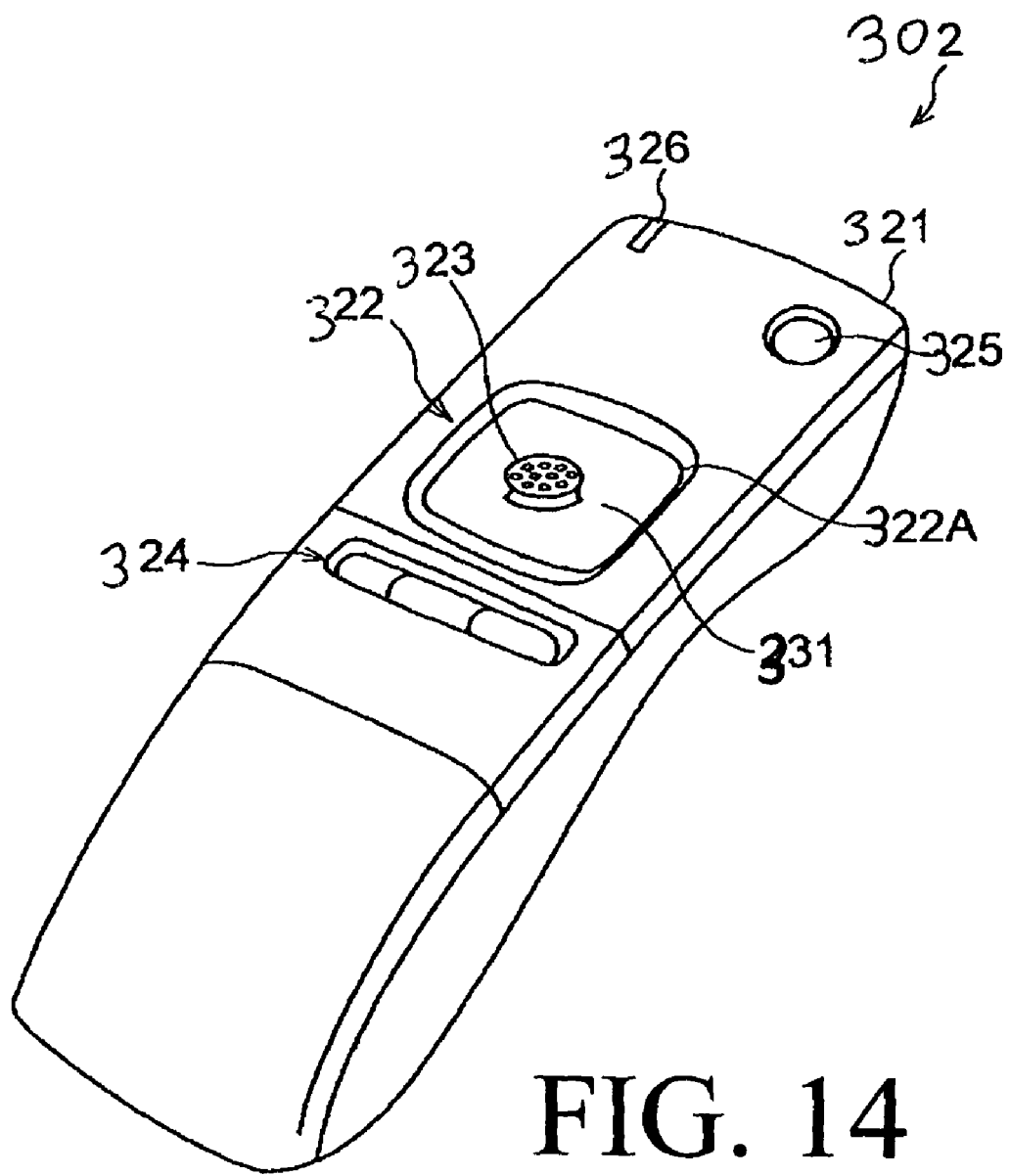
FIG. 14 is an external oblique view showing the configuration of the remote control device of an eighth embodiment of the invention.

FIG. 14 is an external oblique view showing the configuration of the remote control device 302 of an eighth embodiment of the invention.

The remote control device 302 shown in FIG. 14 is used in applications to remotely control a television receiver and personal computer, described below. The remote control device 302 also is of a size and shape appropriate for a user to hold and operate the device 302 with one hand.

As shown in FIG. 14, the remote control device 302 has arranged, on the upper face of the remote control device main unit 321, a position input operation portion (position input device) 322, key switch portion 324, power supply switch 325, and LED (Light-Emitting Diode) 326.

The position input operation portion 322 is positioned substantially in the center of the upper face of the remote control device main unit 321, and has an operation protuberance 323 (operation protuberance portion). The operation protuberance 323 is, for example, in a position enabling the user to touch the operation protuberance 323 with his thumb when holding the remote control device 302 in one hand.

A surface plate (lid) 411 (FIG. 15) forms the upper face of the remote control device main unit 321. A substantially rectangular hole 322A is provided in the surface plate (lid) 411. The operation protuberance 323 protrudes from this hole 322A. The operation protuberance 323 can be slid within the inside of the hole 322A. Preferably, the operation protuberance 323 is capable of being slid upward, downward, and slide to side, and more preferably also in all diagonal directions, essentially permitting a 360 degree freedom of movement in all directions via the user's finger.

The key switch portion 324 comprises one or a plurality of switches. The power supply switch 325 turns on and off the power supply of the equipment controlled by the remote control device 302. The LED 326 functions as an indicator to indicate the operating state of the remote control device 302. For example, the LED 326 is lit during operation of the remote control device 302, but is extinguished when the remote control device 302 remains continuously unused for a fixed length of time.

Figure 15:
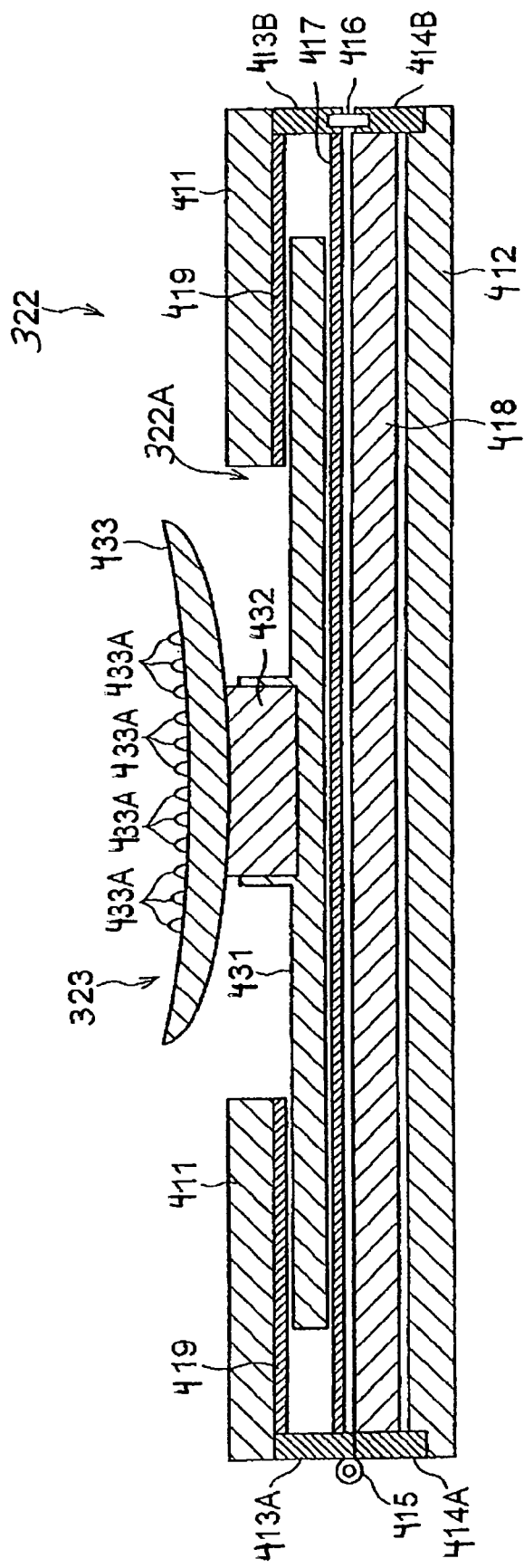
FIG. 15 is a cross-sectional view of principal portions of the position input operation portion of the remote control device of FIG. 14.
Figure 16:
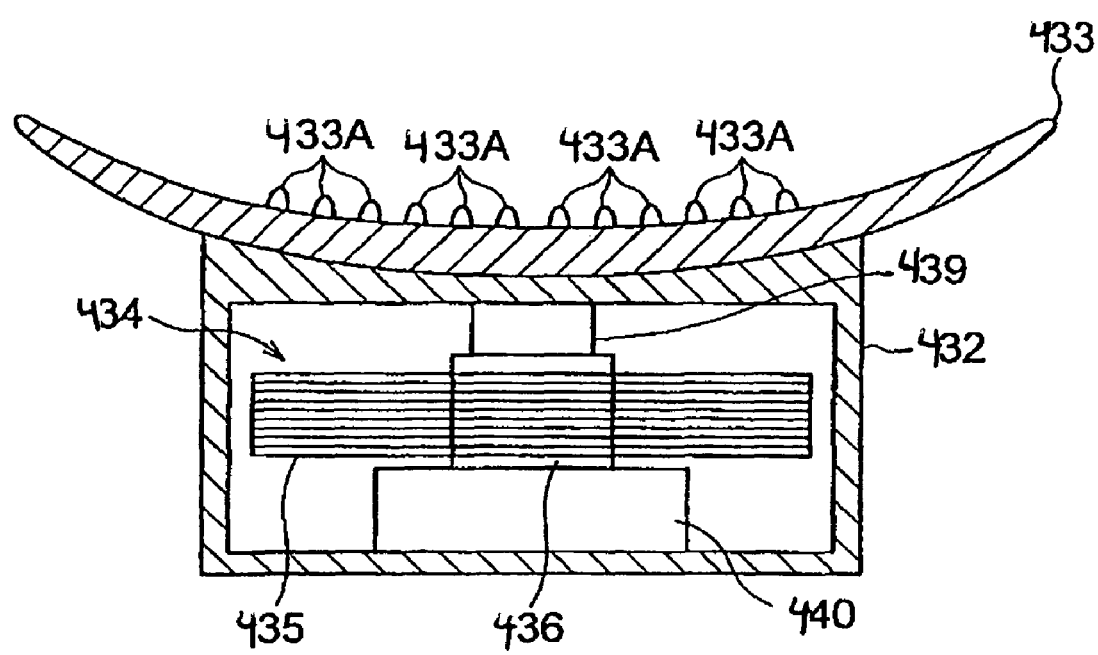
FIG. 16 is a cross-sectional view of principal portions of an operation protuberance in a position input operation portion.

FIG. 15 is a cross-sectional view of principal portions, showing in detail the configuration of the position input operation portion 322. Details of the cross-section of the operation protuberance 323 are shown in FIG. 16, and are omitted from FIG. 15.

As shown in FIG. 15, the position input operation portion 322 has substantially a box-like cross-sectional shape, with the surface plate 411 serving as the upper face and the rear plate 412 as the back face. The side face on one side of the remote control device main unit 321 is formed from an upper-side plate 413A and a lower-side plate 414A. The side face on the other side of the remote control device main unit 321 is formed from an upper-side plate 413B and a lower-side plate 414B. In the space enclosed by the surface plate 411, rear plate 412, upper-side plates 413A and 413B, and lower-side plates 414A and 414B are housed and stacked a sensor base (sense portion) 418 and a flat pedestal (flat plate portion) 431 positioned above the sensor base 418. The operation protuberance 323A is erected on the flat pedestal 431.

The sensor base 418 includes a plurality of layers, in which are formed loop coil groups 441 and 442 (FIG. 18), described below. The sensor base 418 is fixed to the rear plate 412. The flat pedestal 431 is positioned so as to be interposed between the sensor base 418 and the rear face of the surface plate 411. The hole 322A provided in the surface plate 411 is smaller than the sensor base 418, and the flat pedestal 431 is larger than the hole 322A, and moreover is smaller in size than the sensor base 418. Consequently the flat pedestal 431 can move along the face of the sensor base 418 in arbitrary (preferably all) directions, but cannot be removed from the hole 322A without first disassembling the remote control device main unit 321.

A support plate 417 is provided between the flat pedestal 431 and the sensor base 418. The support plate 417 is fixed to the upper-side plate 413A and upper-side plate 413B, and supports the flat pedestal 431 from the side of the rear plate 412, that is, from below. It is desirable that the support plate 417 not impede position detection operation by the sensor base 418, described below. The support plate 417 is preferably formed from, for example, a synthetic resin or other insulator.

In this way, the flat pedestal 431 is positioned between the surface plate 411 and the sensor base 418, and is supported by the support plate 417 so as to enable movement by sliding along the flat face of the sensor base 418.

A friction material 419 is affixed to the interface at which the front face of the flat pedestal 431 and the rear face of the surface plate 411 make contact. The friction material 419 comprises a sheet or plate-like member formed from a material having a prescribed friction coefficient. When moving the flat pedestal 431 in horizontal directions, that is, parallel relative to the plane in which the flat pedestal 431 sits, an appropriate amount of friction is generated by the friction material 419, so that there is the advantageous result that the sense of stability is increased when performing operations which involve moving the operation protuberance 323. A film or similar member having a prescribed frictional coefficient similar to the friction material 419 may be placed at the surface of the support plate 417 positioned below the flat pedestal 431, or, the support plate 417 itself may have a prescribed frictional coefficient, to cause the appropriate amount of friction when moving the flat pedestal 431.

Here, the planar shapes of the sensor base 418 and flat pedestal 431 are arbitrary, and may be circular, elliptical, rectangular, or another shape. In this eighth embodiment, the drawings and explanation assume an example of a sensor base 418 with a rectangular shape.

The operation protuberance 323 comprises a substantially columnar-shaped shaft portion 432 which is erect on the flat pedestal 431, and a contact face portion 433 positioned so as to cover the upper face of the shaft portion 432. The contact face portion 433 is formed as a curved surface, concave upwards, on the surface of which are formed a plurality of slip-halting protrusions 433A. The user's finger makes contact with the contact face portion 433 during operation of the remote control device 302. By providing the slip-halting protrusions 433A, slipping between the user's finger and the contact face portion 433 during operations can be prevented, to achieve satisfactory operability.

FIG. 16 is a cross-sectional view showing the detailed configuration of the operation protuberance 323, and in particular showing the cross-sections of the shaft portion 432 and contact face portion 433.

As shown in FIG. 16, the shaft portion 432 of the operation protuberance 323 is hollow to define a space (or cavity). In this space are housed a tact switch 440, and a ferrite core 436 stacked on the tact switch. The upper end of the ferrite core 436 abuts the lower face of a spacer 439. The upper face of the spacer 439 is in contact with the upper wall-defining portion of the cavity of the shaft portion 432.

The tact switch 440 is a switch which is turned on upon bending and deformation in response to a prescribed depressing pressure on the contact face portion 433. The tact switch 440 returns to its original state when the depressing pressure is removed from contact face portion 433. The tact switch 440 is enclosed between the upper face and the bottom face within the shaft portion 432, with the spacer 439 and ferrite core 436 intervening. When the contact face portion 433 is depressed, the depressing pressure is transmitted and applied to the tact switch 440, which is turned on. At this time, i.e., upon depression, the tact switch 440 undergoes a clicking operation, so that the user's hand feels a clicking sensation upon operating the contact face portion 433.

It is preferable that the material forming the shaft portion 432 have a degree of elasticity sufficient for bending when the prescribed depressing pressure is applied, so that by depressing the operation protuberance 323 the tact switch 440 is reliably turned on.

Figure 18:
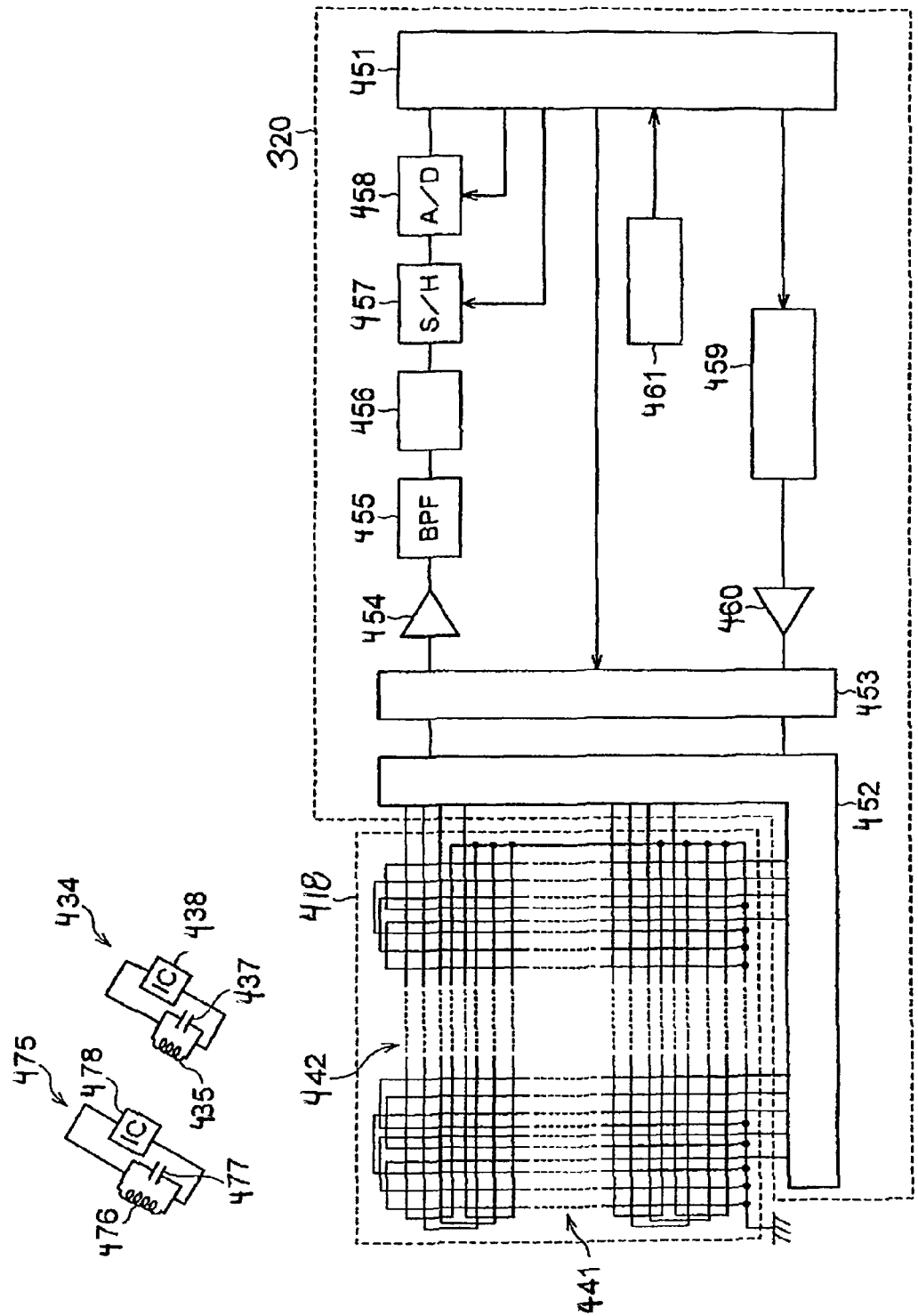
FIG. 18 shows the configuration of the position detection circuit of a remote control device.

A coil 435 is wound around the periphery of the substantially columnar-shaped ferrite core 436. This coil 435 is connected in parallel to capacitor 437 (FIG. 18), and is further connected to IC 438 (FIG. 18). The capacitor 437 and the IC 438 are for example mounted on a board (not shown) positioned in the space within the shaft portion 432.

The coil 435, capacitor 437 and IC 438 form an operation-side circuit 434. This operation-side circuit 434 causes an electromagnetic induction action, described below, with the loop coil groups 441, 442 (FIG. 18) provided in the sensor base 418 (FIG. 15). Based on this electromagnetic induction action, the position of the operation-side circuit 434 on the sensor base 418, that is, the position of the operation protuberance 323, is detected.

According to the above configuration, a user operating the remote control device 302 can perform a position input operation by sliding the operation protuberance 323 to an arbitrary/selected position.

As shown in FIG. 15, the upper-side plate 413A and lower-side plate 414A which form one of the sides of the remote control device main unit 321 are connected rotatably by a hinge 415. The upper-side plate 413B and lower-side plate 414B which form the opposite side of the remote control device main unit 321 are connected via a latch member 416. The latch member 416 can be attached to and removed from the lower-side plate 414B.

If the latch member 416 is removed or otherwise unlatched from the lower-side plate 414B, the surface plate 411 can be rotated about the hinge 415. As explained above, the support plate 417 is fixed to the upper-side plates 413A, 413B, so that when the surface plate 411 is rotated, the upper-side plates 413A and 413B, operation protuberance 323, flat pedestal 431, and support plate 417 move integrally with the surface plate 411.

Further, in the vicinity of the hinge 415, a switch 461A (FIG. 18) is positioned between the upper-side plate 413A and lower-side plate 414A. This switch 461A is turned on when the upper-side plate 413A and lower-side plate 414A are in proximity, and is turned off when the side plates 413A and 414A are distant. The opening and closing of the surface plate 411 can be detected based on the on/off state of the switch 461A.

Figure 17:
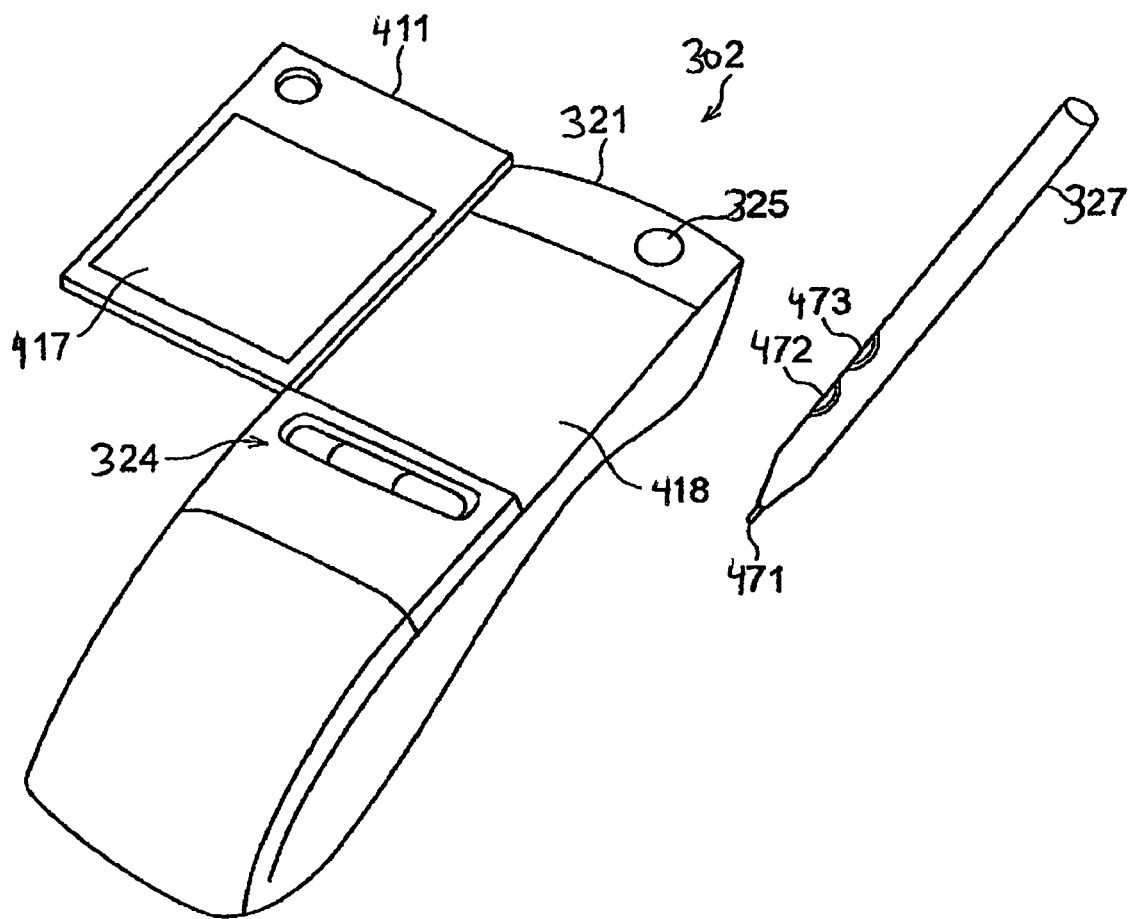
FIG. 17 is an external oblique view showing the state in which the surface plate of the remote control device is in the opened state.

FIG. 17 is an external oblique view showing the state in which the surface plate 411 is opened.

As shown in FIG. 17, when the surface plate 411 is rotated about the hinge 415, the sensor base 418 is exposed on the top face of the remote control device main unit 321. In this state, the operation protuberance 323 is distant from and non-operational relative to the sensor base 418, and so position input operations using the operation protuberance 323 are not possible; but an input pen 327 (also referred to herein as a position indictor) can be used to perform position input operations on the exposed sensor base 418.

As further shown in FIG. 17, the position indicator 327 has a body with a shape imitating a stylus, and a core 471 protrudes from the tip of the body. Two switches 472, 473 are arranged on a side face of the body of the position indicator 327.

The position indicator 327 incorporates in the body an indicator-side circuit 475 (FIG. 18), described below. The functions of the indicator-side circuit 475 permit detection of a depressing pressure (stylus pressure) applied to the core 471, and the operating states of the switches 473 and 474.

Operations using the position indicator 327 are performed by the user by holding the body of the position indicator 327 in the hand as if holding a pen, and bringing the core 417 into contact with, or pressing down on, the sensor base 418. The position at which the core 471 makes contact with the sensor base 418 (the operation position) is detected.

Also provided is a position detection circuit (position detection unit) 320 (FIG. 18) for detecting position input operations using the position input operation portion 322 of the remote control device 302, the operation protuberance 323, and the position indicator 327. The position detection circuit 320 is, for example, embedded below or on the side of the sensor base 418. This position detection circuit 320 is explained below.

FIG. 18 shows in detail the configuration of a position detection circuit 320. To facilitate an understanding of the position detection circuit 320, in FIG. 18 the loop coil groups 441, 442 positioned in the sensor base 418 (FIG. 15), operation-side circuit 434 incorporated within the operation protuberance 323 (FIG. 14), and indicator-side circuit 475 incorporated within the position indicator 327 (FIG. 17), are shown together with the position detection circuit 320.

The operation-side circuit 434 incorporated into the operation protuberance 323 includes the above-described coil 435 and capacitor 437 connected in parallel, and further includes the IC 438. The indicator-side circuit 475 incorporated into the position indicator 327 is configured with a coil 476 and a capacitor 477 housed in the vicinity of the tip of the body of the position indicator 327. The coil 476 and the capacitor 477 are connected in parallel and further are connected to an IC 478.

In the sensor base 418, a virtual X-Y orthogonal coordinate system is set including an X axis and Y axis corresponding to the horizontal and vertical directions, and the loop coil groups 441, 442 are positioned corresponding to this X-Y orthogonal coordinate system. Here, the hole 322A is formed in substantially a rectangular shape, similarly to the sensor base 418, so that the above X-Y orthogonal coordinate system also corresponds to the horizontal and vertical directions of the hole 322A. The loop coil group 441 comprises a plurality of loop coils, extending in the Y direction and arranged adjacent to one another along the X direction. The loop coil group 442 comprises a plurality of loop coils, extending in the X direction and arranged adjacent to one another along the Y direction. Each of the loop coils in the loop coil groups 441 and 442 is a coil of a conductor with one or a plurality of (for example, two, three, or more) turns, and is formed by etching or other methods.

Each of the loop coils in these loop coil groups 441 and 442 is connected to the position detection circuit 320.

The position detection circuit 320 is connected to each of the loop coils in the loop coil groups 441 and 442. The position detection circuit 320 comprises a selection circuit 452, which selects one loop coil from among these loop coils. The position detection circuit 320 further comprises a transmit/receive switching circuit 453, which switches between a transmission mode in which an oscillation signal is transmitted to the loop coil selected by the selection circuit 452, and a reception mode in which a signal is received by the loop coil selected by the selection circuit 452.

The position detection circuit 320 further comprises a control circuit 451, which controls each of the portions of the position detection circuit 320; an amplification circuit 454, which amplifies the signal output from the transmit/receive switching circuit 453; a BPF (band-pass filter) 455, which passes only the signal component in a prescribed frequency band of the signal amplified by the amplification circuit 454; a detection circuit 456, which converts the signal component passed by the BPF 455 into a voltage value; a sample/hold circuit 457, which holds the voltage value for a prescribed time; an A/D conversion circuit 458, which converts the voltage value held by the sample/hold circuit 457 into digital data and outputs the data to the control circuit 451; a signal generation circuit 459, which generates an oscillation signal of prescribed frequency according to control by the control circuit 451; and an amplification circuit 460, which amplifies the oscillation signal generated by the signal generation circuit 459, and outputs the resulting signal to the transmit/receive switching circuit 453. The structure and operation of the position detection circuit 320 is similar to position detection circuit 20 described above in connection with FIG. 6.

The position detection circuit 320 detects operations using the operation protuberance 323 and position indicator 327 as follows.

First, the control circuit 451 controls the selection circuit 452 to cause selection of one loop coil from among the loop coil groups 441, 442, and controls the transmit/receive switching circuit 453 to switch the operating mode to transmission mode.

Next, the control circuit 451 controls the signal generation circuit 459 to generate an oscillation signal of prescribed frequency. This oscillation signal is amplified by the amplification circuit 460, input to the selection circuit 452 via the transmit/receive switching circuit 453, and is transmitted, from the loop coil selected by the selection circuit 452, to the operation-side circuit 434 or to the indicator-side circuit 475.

Here, when operations are being performed using the operation protuberance 323, in the operation-side circuit 434, an induced current flows in the coil 435 based on the signal transmitted from a loop coil of the sensor base 418, and the IC 438 begins operation. The IC 438 generates an oscillation signal of prescribed frequency for the coil 435 and capacitor 437, and this oscillation signal is transmitted from the coil 435 to the sensor base 418.

When operations are being performed using the position indicator 327, in the indicator-side circuit 475, an induced current flows in the coil 476 based on the signal transmitted from a loop coil of the sensor base 418, and the IC 478 begins operation. The IC 478 generates an oscillation signal of prescribed frequency for the coil 476 and capacitor 477, and this oscillation signal is transmitted from the coil 476 to the sensor base 418.

On the other hand, the control circuit 451 of the position detection circuit 320, after continuing operation in the above transmission mode for a prescribed length of time, controls the transmit/receive switching circuit 453 to switch the operating mode into reception mode. By switching modes, the oscillation signal from the signal oscillation circuit 459 is no longer output to the selection circuit 452.

In the reception mode, the oscillation signal transmitted from the coil 435 or coil 476 is received by the loop coil selected by the selection circuit 452, and after amplification by the amplification circuit 454, only the component in a prescribed frequency band is output by the BPF 455 to the detection circuit 456. This signal component is converted into a voltage value by the detection circuit 456, and the voltage value is held by the sample/hold circuit 457. The voltage value held by the sample/hold circuit 457 is converted into digital data by the A/D conversion circuit 458 at each prescribed time interval, and the data is output to the control circuit 451.

The control circuit 451 causes the selection circuit 452 to select loop coils of the loop coil groups 441, 442 in succession, while performing computation processing of digital data input from the A/D conversion circuit 458. The loop coil closest to the operation protuberance 323 or core 471 is identified, and the absolute coordinates of the identified position are determined.

When operations are being performed using the operation protuberance 323, the IC 438 of the operation-side circuit 434 detects the operating state (on/off) of the tact switch 440 (FIG. 16) during the period in which an induced current is flowing in the coil 435, and causes the transmission timing and transmission time of the oscillation signal for the coil 435 and capacitor 437 to be changed according to this operating state. This change in the transmission timing and transmission time is reflected when converting voltage values held by the sample/hold circuit 457 into digital data by means of the A/D conversion circuit 458. The control circuit 451 then performs computation processing of the digital data input from the A/D conversion circuit 458 to acquire the operating state of the tact switch 440.

When operation is performed using the position indicator 327, while an induced current is flowing in the coil 476 the IC 478 of the indicator-side circuit 475 detects the depressing pressure applied to the core 471, and in addition detects the operating states of the switches 473, 474, and changes the transmission timing and transmission time of the oscillation signal for the coil 476 and capacitor 477 according to these operating states. The change in the transmission timing and transmission time is reflected when converting the voltage value held by the sample/hold circuit 457 into digital data using the A/D conversion circuit 458. The control circuit 451 then performs computation processing of digital data input from the A/D conversion circuit 458 to acquire the depressing pressure applied to the core 471 and operating states of the switches 473 and 474.

In this way, the control circuit 451 acquires the operation position during operations using either the operation protuberance 323 or the position indicator 327. Further, the control circuit 451 acquires the operating state of the tact switch 440 during operations using the operation protuberance 323, and acquires the depressing pressure applied to the core 471 and the operating states of the switches 473 and 474 during operations using the position indicator 327.

When performing operations using the operation protuberance 323 with the surface plate 411 in the closed state (FIG. 14), the area in which the operation protuberance 323 can be moved is restricted to the inside of the hole 322A. Portions of the sensor base 418 covered by the surface plate 411, i.e., outside of hole 322A, is not available. On the other hand, when performing operations using the position indicator 327 with the surface plate 411 in the opened state (FIG. 17), the area in which operations can be performed using the position indicator 327 is the entirety of the sensor base 418 exposed on the upper face of the remote control device main unit 321. Hence the size of the area in which operations are possible is different in the state in which the surface plate 411 is opened, compared to the state in which the surface plate 411 is closed. As explained above, the position detection circuit 320 detects the position of operation of the operation protuberance 323 or the position indicator 327 as an absolute position. Hence it is desirable that the area taken as reference when determining the absolute coordinates be switched to correspond to the state of operation, i.e., whether the operation protuberance 323 or the position indicator 327 is active, in order to accommodate the different areas over which operations can be performed.

The position detection circuit 320 comprises an opened/closed detection circuit 461, to detect the opened or closed state of the surface plate 411 based on the state (on/off) of the switch 261A (FIG. 15). In this regard, the position detection circuit 320 differs from circuit 20 of FIG. 6.

When the opened/closed detection circuit 461 detects that the surface plate 411 is opened, the position detection circuit 20 determines that operations on the sensor base 418 are to be performed using the position indicator 327, and sets the area over which operations are detected (the detection area) on the sensor base 418 to correspond to the area of the sensor base 418 exposed when the surface plate 411 is opened.

On the other hand, when the opened/closed detection circuit 461 detects that the surface plate 411 is closed, the position detection circuit 320 determines that operations on the sensor base 418 are to be performed using the operation protuberance 323, and sets the area over which operations are detected (the detection area) on the sensor base to the area corresponding to the range over which movement of the operation protuberance 323 is possible, i.e., corresponding approximately to the dimensions of the hole 322A.

Further, when an operation is performed to open or close the surface plate 411, the operation protuberance 323 moves so as to approach or recede from the sensor base 418. During this movement of the operation protuberance 323, if the position of the operation protuberance 323 is detected by the position detection circuit 320, movement of the operation protuberance 323 not intended by the user is detected. To avoid this problem, the position detection circuit 320 stops operation, i.e., detection of the position of the operation protuberance 323, during periods in which the surface plate 211 is being opened or closed.

Figure 19:
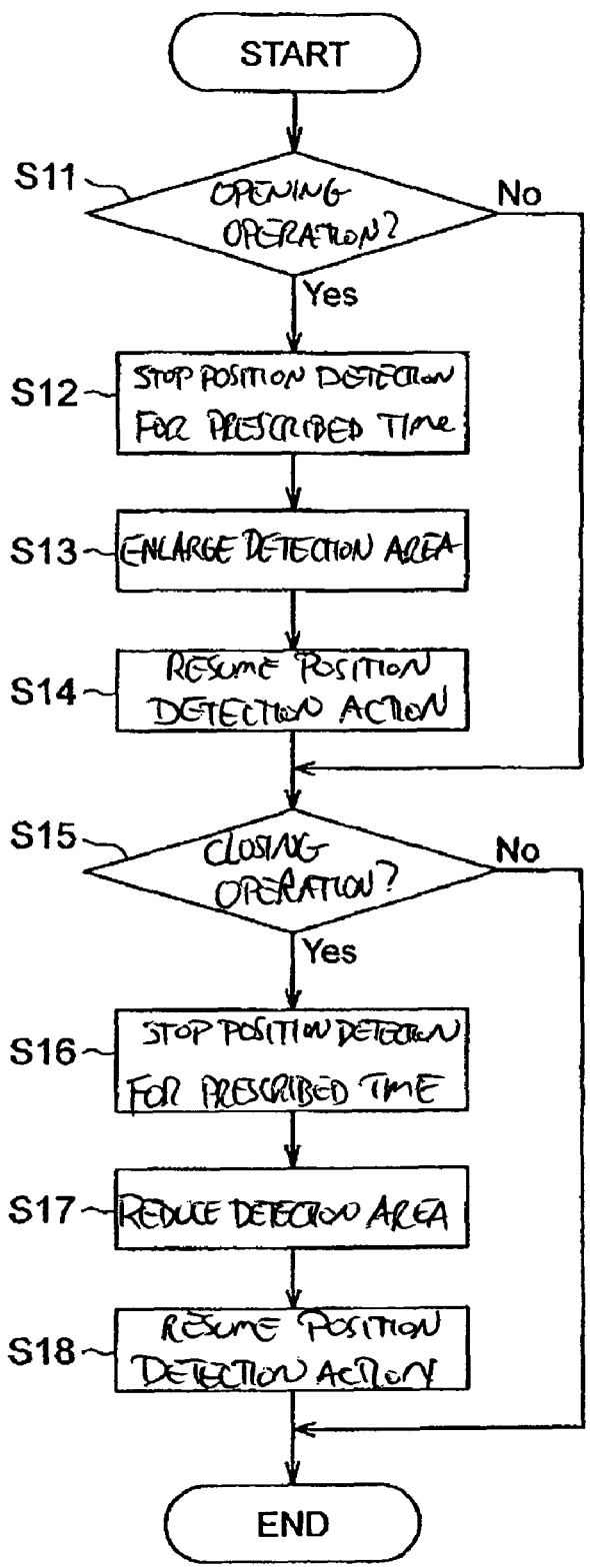
FIG. 19 is a flowchart showing operation of a position detection circuit.

The series of operations by the position detection circuit 320 accompanying the opening and closing of the surface plate 411 is shown in FIG. 19.

FIG. 19 is a flowchart showing operation of the position detection circuit 320 during opening and closing of the surface plate 411. The operation shown in FIG. 19 comprises processing steps executed based on signals input from the opening/closing detection circuit 461 to the control circuit 451 when an operation of closing the opened surface plate 411, or an operation of opening the closed surface plate 411, is detected by the opening/closing detection circuit 461 (FIG. 18).

The control circuit 451 determines whether the surface plate 411 is being opened, based on a signal input from the opening/closing detection circuit 461 (step S11). When a lid opening operation is performed, so that the surface plate 411 changes from the closed state to the opened state (step S11: Yes), the control circuit 451 stops position detection operation using the loop coil groups 441, 442 for a prescribed length of time (step S12). This prescribed length of time is longer than the time from start to completion of opening of the surface plate 411 by the user, and more specifically, is longer than the time required to open the surface plate 411 to a position in which the operation protuberance 323 leaves the area in which position detection by the sensor base 418 is possible. Hence the time may be set in advance to the average time estimated to be required for a user to open or close the surface plate 411, or, to this time plus an additional margin (for example, from one second to several seconds).

Next, the control circuit 451 performs processing to set the detection area for performing position detection on the sensor base 418 to be larger, corresponding to the fact that the surface plate 411 is opened and the sensor base 418 is exposed (step S13), and resumes position detection operation (step S14).

When in step S14 position detection operation is resumed, or when in step S11 an operation to open the surface plate 411 has not been detected, the control circuit 451 determines whether there has been an operation to close the surface plate 411 (step S15). Here, when a closing operation is performed and the surface plate 411 changes from an opened state to a closed state (step S15: Yes), the control circuit 451 stops the position detection operation of the loop coil groups 441, 442 for a prescribed length of time (step S16). Similarly to the prescribed length of time in the above step S12, it is preferable that the prescribed length of time for step S16 time be longer than a period from the start of the operation to close the surface plate 321 until completion of the operation.

Next, in response to the closing of the surface plate 411, and to prepare for operations using the operation protuberance 323, the control circuit 451 performs processing to set the detection area for position detection on the sensor base 418 to a smaller area (step S17), and resumes position detection operation (step S18).

In the above operations, when the detection area is enlarged by the control circuit 451 in step S13, a greater number of loop coils among the loop coil groups 441, 442 of the sensor base 418, and preferably all the loop coils placed in the sensor base 418, are used to perform position detection. On the other hand, when in step S17 the control circuit 451 narrows the detection area, only those loop coils overlapping the area in which the operation protuberance 323 can be moved among the loop coil groups 441, 442 of the sensor base 418 are used to perform position detection.

When position input operations are performed using the position indicator 327, absolute coordinates for the position of the core 471 in the enlarged detection area are determined. On the other hand, when position input operations are performed using the operation protuberance 323, absolute coordinates for the position of the operation protuberance 323 in the detection area, reduced in size according to the size of the hole 322A, are determined. In this manner, absolute position coordinates are determined in the effective detection area accompanying the opening and closing of the surface plate 411, so that whether the user employs the position indicator 327 or the operation protuberance 323, accurate position input operations can be performed. Moreover, there is a satisfactory correspondence between the range of operation as recognized by the user and the detection area, so that the user does not become confused during operations.

In FIG. 19, an example is shown in which the control circuit 451 repeatedly executes a routine at prescribed time intervals, to detect whether there has been input from the opened/closed detection circuit 461. However, invention is not limited to such a configuration, and for example the control circuit 451 may perform interrupt processing based on an input signal from the opened/closed detection circuit 461.

A remote control device 302 configured as described above is appropriate for use in remote operation of, for example, television receivers or personal computers. Such examples are explained below.

Figure 20:
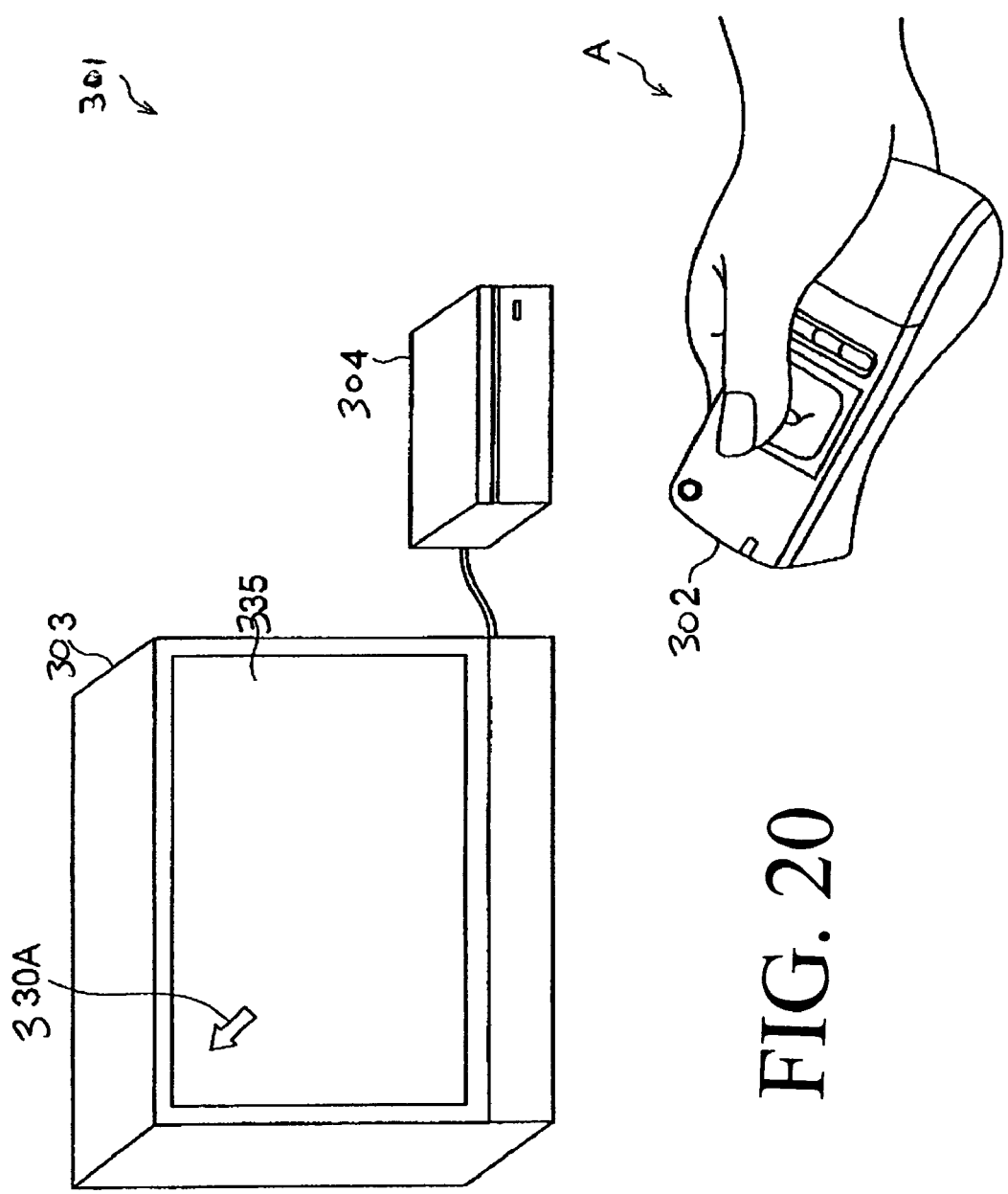
FIG. 20 shows an overview of the configuration of a remote operation system using a remote control device.

FIG. 20 shows an overview of a configuration of a remote operation system 301 including a television receiver 303 and computer 304 which can be remotely operated using a remote control device 302.

In this remote operation system 301, the remote control device 302 is used for operations to input instructions to the television receiver 303 and computer 304. The remote control device 302 is held in the user's hand and operated, as indicated by the symbol A in the figure. When the remote control device 302 is operated, signals indicating the instruction content are wirelessly transmitted from the remote control device 302 to the television receiver 303 or to the computer 304.

The television receiver 303 incorporates a tuner portion 336 (FIG. 21) connected to an antenna for receiving various broadcast waves such as ground-wave analog broadcasts, ground-wave digital broadcasts, and satellite digital broadcasts. The television receiver 303 executes operations to select a specified channel from among receivable broadcasts based on signals wirelessly transmitted from the remote control device 302, and outputs the images and sound for the tuned channel. The television receiver 303 also selects items from a menu displayed on a screen, based on signals wirelessly transmitted from the remote control device 302.

The computer 304 receives signals transmitted wirelessly from the remote control device 302 and executes various programs. For example, the computer 304 generates, and outputs to the television receiver 303, display signals used to display various screens relating to an executed program and to instructions received from the remote control device 302. In this example, the television receiver 303 displays the screens on a display screen 335 based on the display signals input from the computer 304. The display screen 335 may also display, for example, a pointer 330A which moves on the display screen 335 according to position input operations performed using the remote control device 302.

Figure 21:
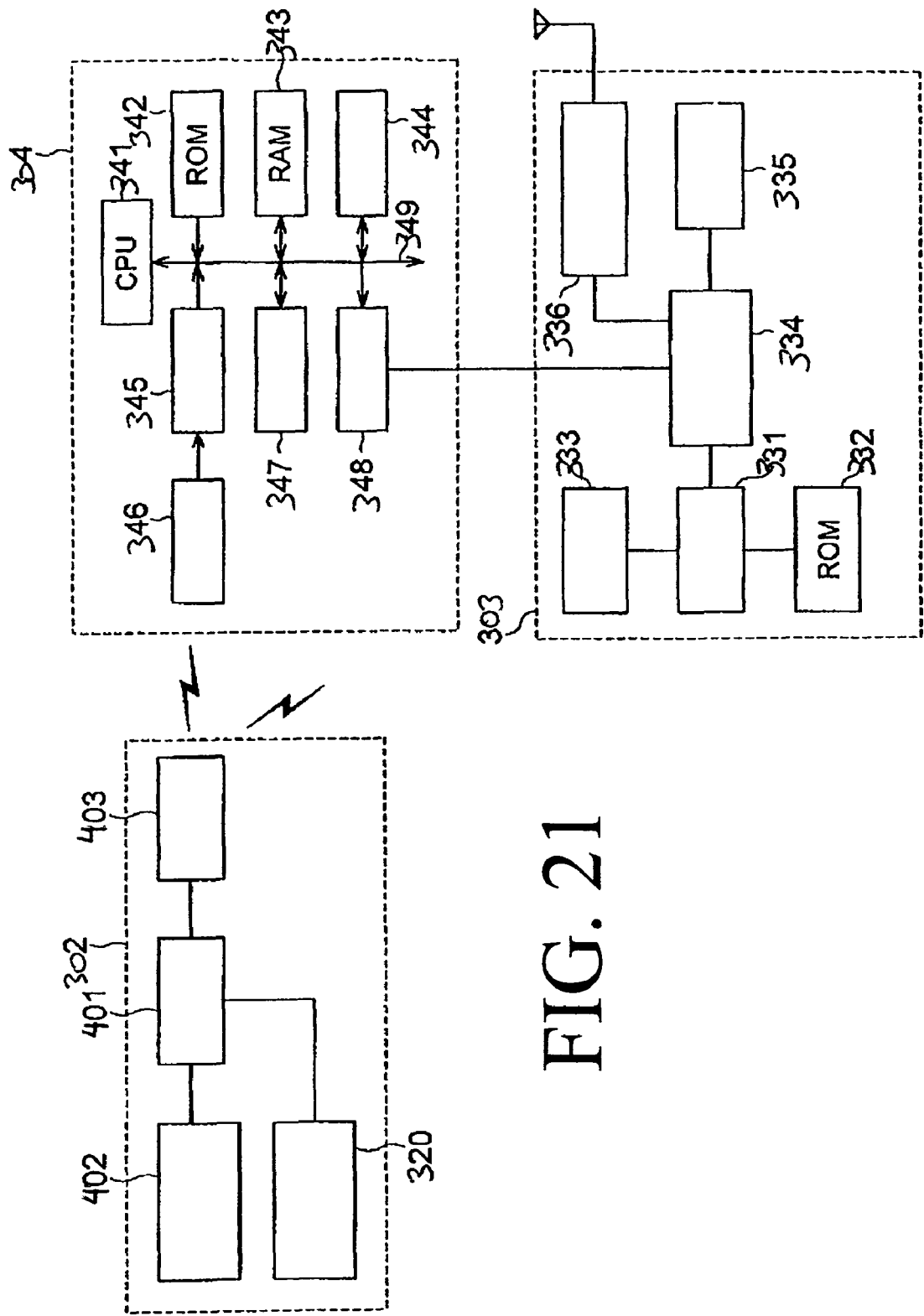
FIG. 21 is a block diagram showing the functional configuration of each portion of a remote operation system.

FIG. 21 is a block diagram showing the functional configuration of each portion of the remote control device 302, television receiver (equipment for operation) 303, and computer (equipment for operation) 304 of the remote operation system 301. The remote control device 302 comprises a key operation detection portion 402, which detects operation of switches of the key switch portion 324; a position detection circuit 320; a control portion 401, which generates and encodes signals corresponding to operations detected by the key operation detection portion 402 and position detection circuit 320, and outputs the encoded signals; and a light-emitting portion (wireless transmission unit) 403, which receives the encoded signals outputted from the control portion 401 and produces light emissions or other signals. The light-emitting portion 403 may include, for example, an infrared LED or other transmitting device which emits light according to signals input from the control portion 401.

The television receiver 303 comprises, in addition to the above-described display screen 335, a control portion (control unit) 331, which executes control operations to display images on the display screen 335 or similar output devices; ROM (Read-Only Memory) 332, which stores data and various programs executed by the control portion 331; a light-receiving portion (reception unit) 333, which receives and decodes infrared signals transmitted from the remote control device 302, and outputs the signals to the control portion 331; an image signal generation portion (display unit) 334, which outputs image signals to the display screen 335 according to control by the control portion 331; and a tuner portion 336, which generates image signals based on broadcast signals input from an externally connected antenna.

The control portion 331 reads and executes data and programs stored in ROM 332, and based on signals input from the light-receiving portion 333, controls the image signal generation portion 334 to cause prescribed images to be displayed on the displays screen 335. When for example a signal input from the light-receiving portion 333 specifies switching of channels, the control portion 331 controls the image signal generation portion 334 to generate image signals from broadcast signals for the specified channel, and causes the signal to be output to the display screen 335.

Further, when a signal input from the light-receiving portion 333 specifies display of a menu screen, the control portion 331 outputs display information to display the menu screen to the image signal generation portion 334, and the image signal generation portion 334 causes the menu screen, containing menu items (not shown), icons (not shown) and similar information, to be displayed on the display screen 335. When, with a menu screen displayed on the display screen 335, a signal indicating a position detected by the position detection circuit 320 is input from the light-receiving portion 333, the contents of the instruction of the position input operation are determined based on the operation information and on display information input from the image signal generation portion 334. An action corresponding to the instruction content is performed. Further, when a signal indicating an operating state of a switch of the key switch portion 324 is input from the light-receiving portion 333, the control portion 331 determines the instruction contents, and performs the action corresponding to the instruction contents. In this manner, operations can be performed on menu screens (such as selecting items on a menu screen or the like) of the television receiver using the remote control device 302.

When a signal to display a screen is input from the computer 304, the image signal generation portion 334 of the television receiver 303 generates display information based on this signal, outputs the information to the display screen 335, and causes a display to appear on the display screen 335.

The computer 304 comprises a CPU (Central Processing Unit) 341, which controls each of the portions of the computer 304 by executing various control programs; ROM 342, which stores control programs and similar programs executed by the CPU (control unit) 341; RAM (Random Access Memory) 343 having a work area to temporarily store data and programs executed by the CPU 341; and a storage portion 344 which stores control programs and application programs executed by the CPU 341, as well as data related to these programs.

The computer 304 further comprises a light-receiving portion (reception unit) 346, which receives and decodes infrared light emitted from the light-emitting portion 403 of the remote control device 302, and generates signals indicating the operation contents in the remote control device 302; an input portion 345, which acquires the signals generated by the light-receiving portion 346 and outputs the signals to the CPU 341; an I/F portion 347, which can be connected to various equipment (not shown) external to the computer 304 and to communication lines and the like; and a display portion (display unit) 348, which analyzes data for screen display generated by the CPU 341, generates signals to display screens, and outputs the signals to the television receiver 303. The above portions are interconnected by a bus 349.

The CPU 341 reads and executes basic control programs stored in ROM 342 to control the various portions of the computer 304. The CPU 241 also reads application programs stored in the storage portion 344, expands the programs in a work area in RAM 343 and executes the programs, to perform various data processing functions. During execution of basic control programs and application programs, the CPU 341 generates data relating to the programs for display on the display screen 335, outputs the data to the display portion 348, and causes the screens to be displayed by the television receiver 303.

When a signal indicating the position detected by the position detection circuit 320 of the remote control device 302 is input from the input portion 345, the CPU 341 determines the instruction contents of the position input operation based on the operation information and the data for screen display output to the display portion 348, and performs the action corresponding to the instruction contents.

Further, when a signal indicating an operating state of a switch of the key switch portion 324 of the remote control device 302 is input from the input portion 345, the CPU 341 determines the operation contents from the operation of the key switch portion 324, and performs the action corresponding to the instruction contents.

In this manner, the remote control device 302 can be used to perform position input operations to the computer 304.

During operation of the computer 304, screens relating to application programs being executed by the computer 304 are displayed on the display screen 335 of the television receiver 303. Various menu screens and GUI (Graphical User Interface) screens may be displayed on the display screen 335, and moreover a pointer 330A such as the example shown in FIG. 20 may be displayed. By moving the pointer 330A to an arbitrary or selected position, and by further operating a switch or similar controller, menu selection operations, operations to select GUI icons, and similar operations can be performed. Consequently by using the position input operation portion 322 of the remote control device 302 to perform either operations for moving the operation protuberance 323 to an arbitrary/selected position or operations with the position indicator 327 to specify an arbitrary/selected position on the sensor base 418, instructions can in effect be issued for substantially all the functions of the computer 304.

As described above with respect to the eighth embodiment, in which the remote control device 302 has a surface plate 411 which can be opened and closed, when the surface plate 411 is in the closed state a position input operation can be performed merely by sliding the operation protuberance 323 of the position input operation portion 322. Further, with the surface plate 411 in the opened state, a position indicator 327 can be used to perform position input operations. Accordingly, the user can perform position input operations using the operation protuberance 323 or the position indicator 327.

By using this remote control device 302 to operate a television receiver 303 and computer 304, various operations can be performed simply. For example, a pointer 330A displayed on a display screen 335 can be easily moved, operations on menu screens and similar displays can be performed, and the television receiver 303 and computer 304 having complex functions can be operated.

In the above eighth embodiment, an explanation was given in which the remote control device 302 transmits signals to a computer 304 by emitting infrared light from a light-emitting portion 403. However, the invention is not limited to such a configuration, and the remote control device 302 may transmit signals using wireless communication methods conforming to the IEEE (Institute of Electrical and Electronic Engineers) 802.11 standard or to the Bluetooth standard, or other wireless communication methods which can be used over comparatively short distances.

Further, in the above eighth embodiment, an explanation was given in which the surface plate 411 can be opened and closed about a hinge 415. It should be understood that the present invention is not limited to such a configuration, and for example a configuration is possible in which the surface plate 411 is slid substantially horizontally to expose the sensor base 418. Such a configuration is explained below as part of a ninth embodiment.

Ninth Embodiment

Figure 22:
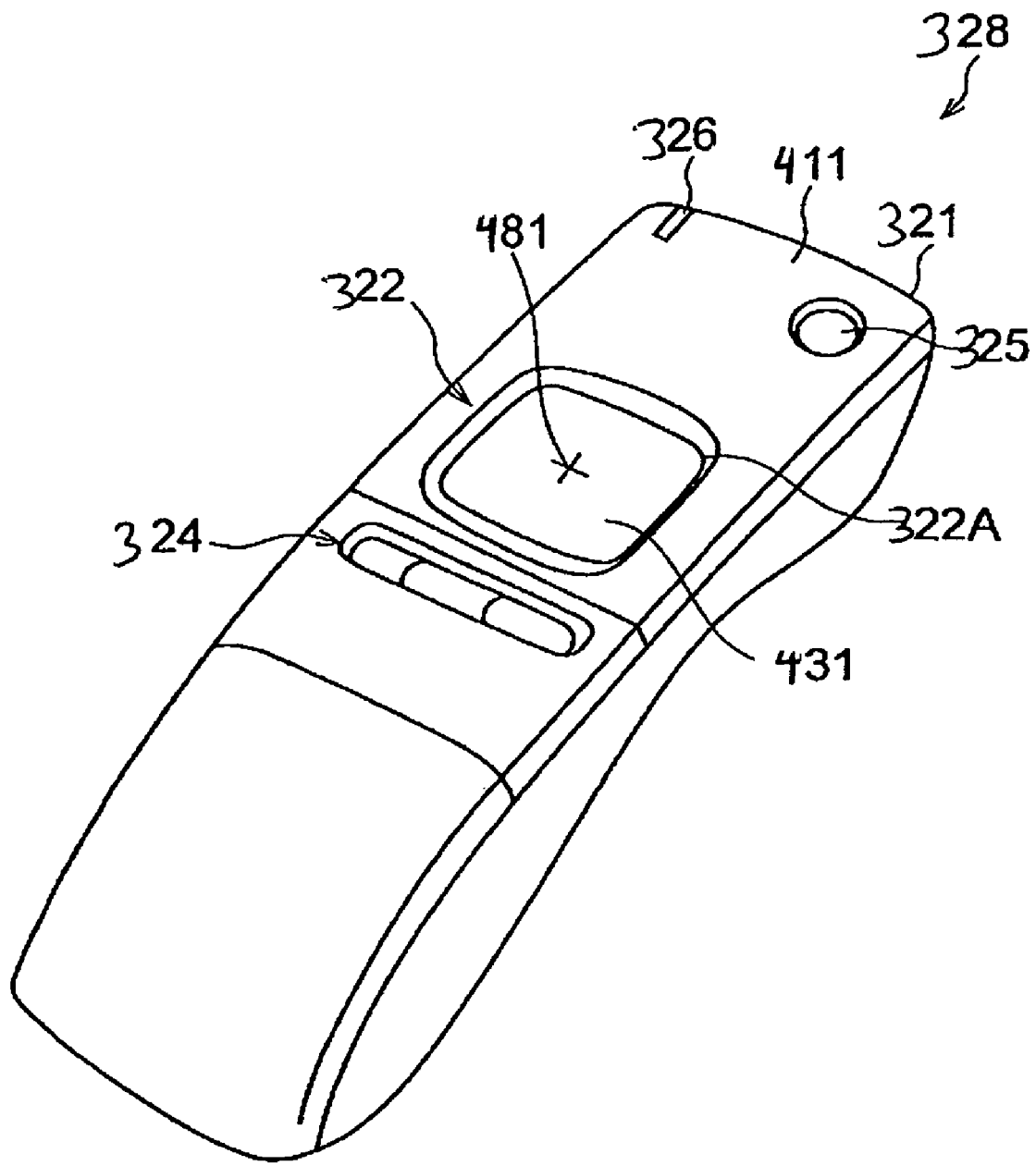
FIG. 22 is an external oblique view showing the configuration of the remote control device of a ninth embodiment of the invention.

FIG. 22 is an external oblique view showing the configuration of the remote control device of a ninth embodiment of the invention.

The remote control device 302 of this ninth embodiment has constituent portions common with the remote control device 302 of the above eighth embodiment, and so common constituent portions are assigned the same symbols, and redundant drawings and explanations are omitted.

The remote control device 302 shown in FIG. 22 is provided with an operation position mark (operation element) 481 in substantially the center of a flat pedestal 431 of the position input operation portion 322. The operation position mark 481 is a character, symbol, or graphic, which is formed on the flat pedestal 431 by printing, application, affixing, or some other method. The operation position mark 481 designates the position which the user touches with his or her finger when operating the remote control device 302. The character, symbol or graphic representing the operation position mark 481 is provided to make explicit to the user the operation position.

An operation-side circuit 434 (FIG. 18) is embedded in the flat pedestal 431, such as in the portion at which this operation position mark 481 is formed. The remote control device 302 can detect the position of the operation position mark 481 on the sensor base 418. The user, by bringing a finger into contact with the operation position mark 481 and sliding the flat pedestal 431, can perform position input operations.

The operation position mark 481 may be formed from a material similar to the other portions of the flat pedestal 431, or may be formed from a material which has a different tactile sensation from the other portions of the flat pedestal 431. Further, the operation position mark 481 may be formed from a material which gives rise to a prescribed friction, or a material which tends to cause friction may be applied to or otherwise affixed onto the operation position mark 481 to prevent slipping of the finger during operation.

In the remote control device 302 of this ninth embodiment, the surface plate 411 is placed so as to enable sliding along the length direction of the remote control device body 321 to expose the sensor base 418. A state in which the surface plate 411 has been slid to expose the sensor base 418 is shown in FIG. 23.

Figure 23:
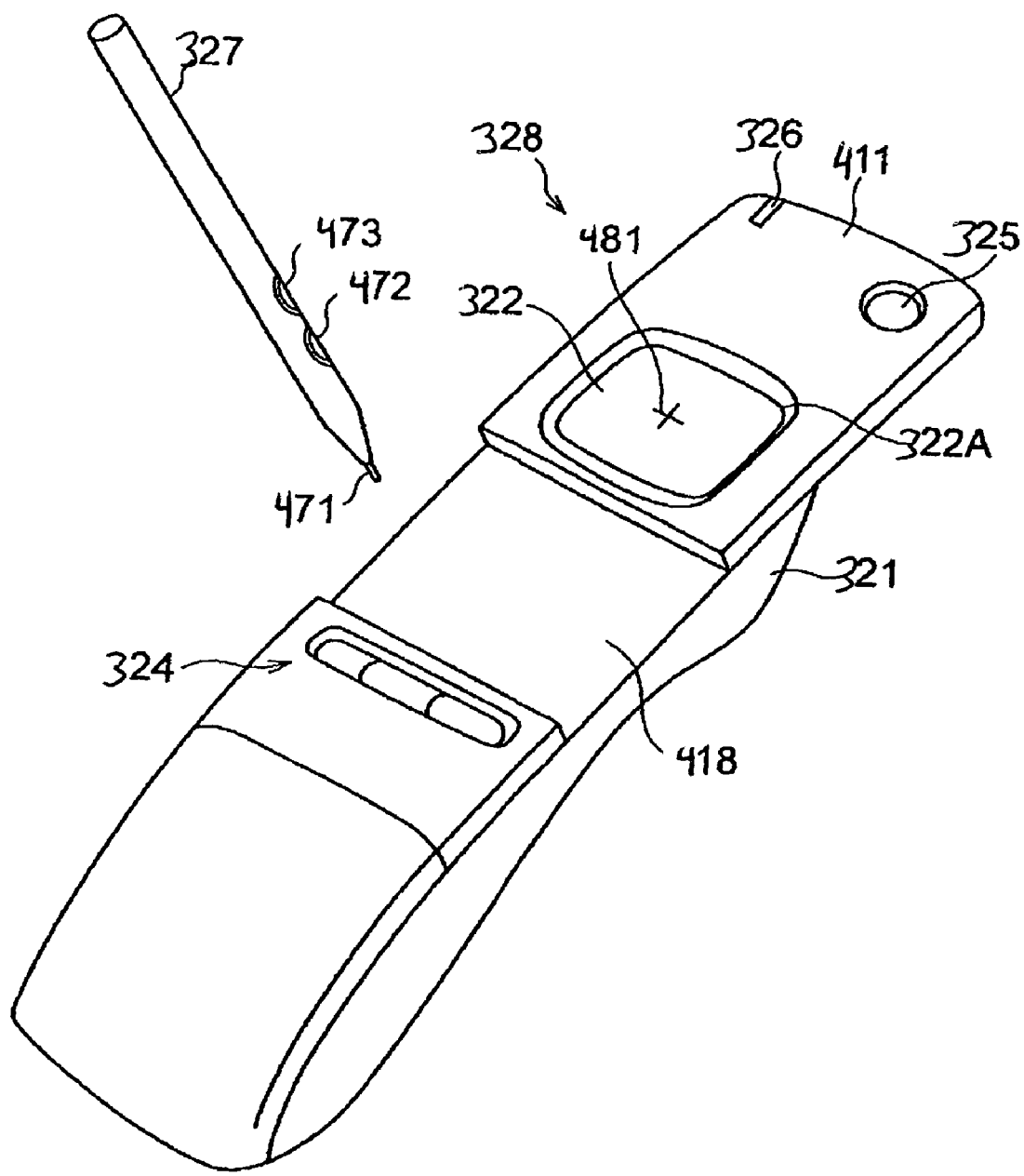
FIG. 23 is an external oblique view, showing a state in which the surface plate of the remote control device of the ninth embodiment is opened.

As shown in FIG. 23, the surface plate 411 slides upwards so that a portion of the flat pedestal 431 protrudes from the length-direction upper end of the remote control device body 321. In the state shown in FIG. 23, the sensor base 418 is exposed at the upper face of the remote control device body 321, and the position indicator 327 can be used to perform position input operations on the sensor base 418.

Further, a switch equivalent to the switch 461A (FIG. 15) may be provided at a position on the remote control device 302 enabling detection of sliding movement of the surface plate 411. In this case, if the switch is connected to an opened/closed detection circuit 461 (FIG. 18), the position detection circuit 320 enables processing to switch the detection area according to the opened or closed state of the surface plate 411, and processing to stop position detection during opening or closing operations of the surface plate 411.

In this way, in the ninth embodiment of the invention, by including a surface plate 411 which slides in the length direction along the remote control device body 321, switching position input operations between the position input operation portion 322 and the position indicator 327 is possible, and advantageous results similar to those of the above-described eighth embodiment can be obtained. Further, by eliminating the operation protuberance 323 in the position input operation portion 322, advantageously no portions of the remote control device body 321 protrude in the thickness direction, so that a remote control device 302 with a shape affording excellent storage properties can be realized.

Tenth Embodiment

Figure 24:
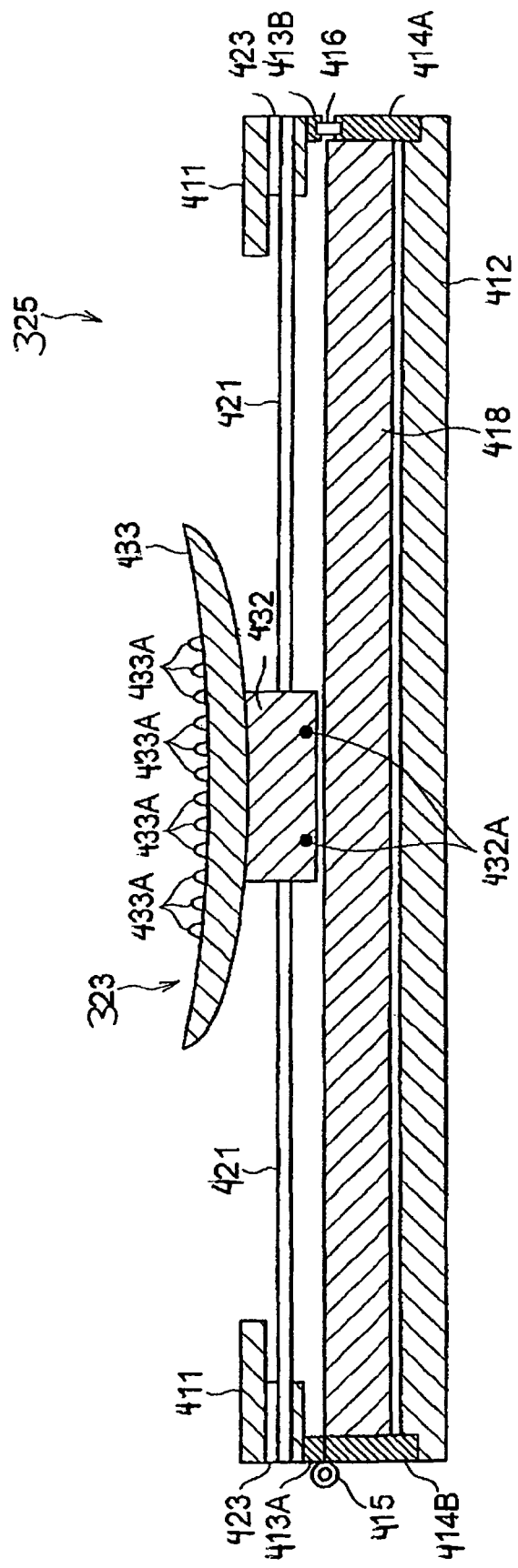
FIG. 24 is a cross-sectional view of principal portions of the position input operation portion of the remote control device of a tenth embodiment of the invention.
Figure 25:
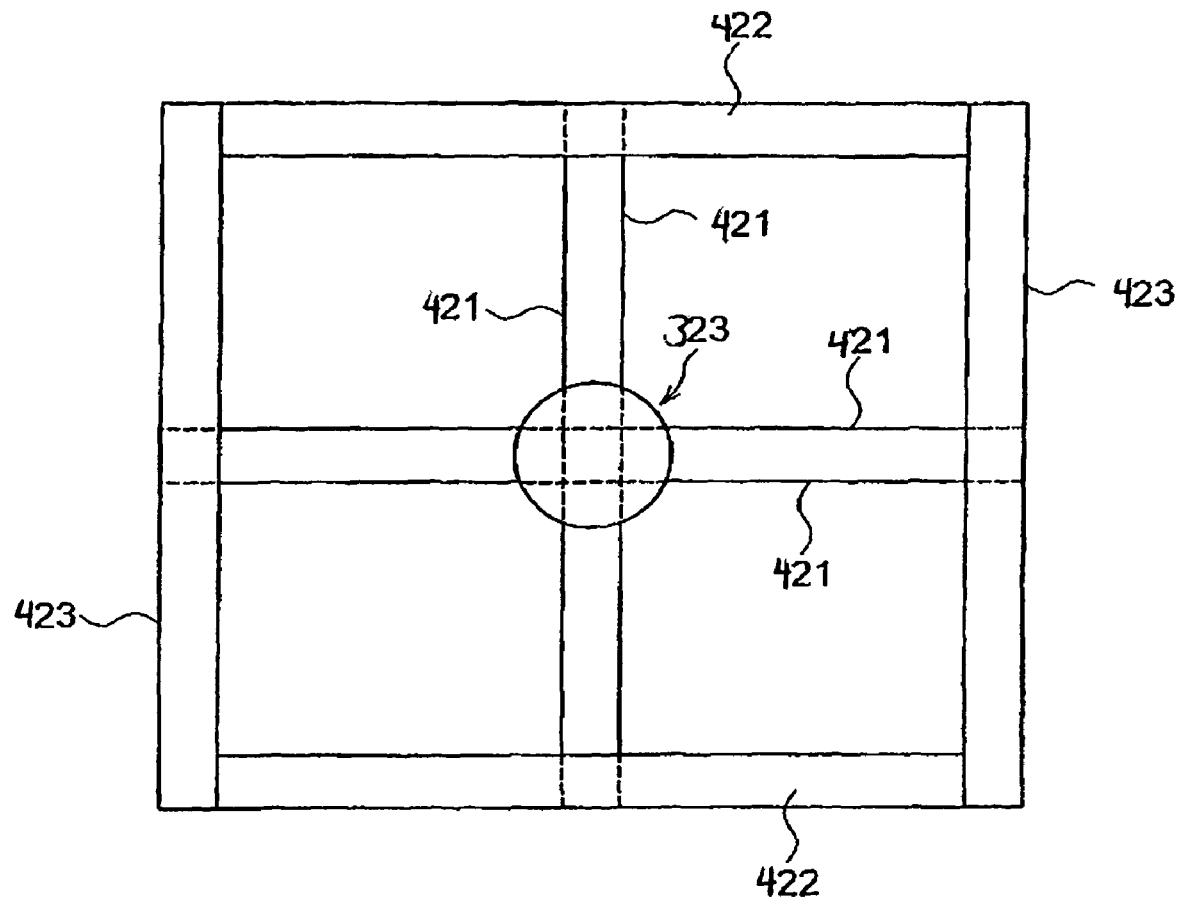
FIG. 25 is a plane view of principal portions of the position input operation portion of the tenth embodiment.

FIG. 24 is a cross-sectional view of principal portions of the position input operation portion 325 of the remote control device of a tenth embodiment of the invention. FIG. 25 is a plane view of principal portions.

The position input operation portion 325 shown in FIG. 24 and FIG. 25 replaces the position input operation portions in the above-described eighth and ninth embodiments.

In this position input operation portion 325, a frame is provided including the sliding support members 422, 423, on upper-side plates 413A, 413B above a hinge 415, and an operation protuberance 323 is supported on the inside of this frame. Here, the wires 421 and sliding support members 422, 423 form a support mechanism.

The portions of the position input operation portion 325 in this tenth embodiment are common to those of the position input operation portion 322 in the above-described eighth and ninth embodiments, except for the wires 421 and sliding support members 422, 423. Constructions and operation are similar in many regards to those of FIGS. 9 and 10 above. Accordingly, in the interest of brevity common constituent portions are assigned the same symbols, and explanations are omitted.

The slide support members 422, 423 are rod-shaped members in which a groove is formed along the length direction. As shown in FIG. 25, the slide support members 423 are positioned on both side ends of the position input operation portion 325 along the length direction of the remote control device 302. The slide support members 422 are positioned on the front end and back end of the position input operation portion 325, oriented perpendicular to the slide support members 423. The grooves formed in these slide support members 422, 423 are positioned so as to open toward the inside of the position input operation portion 325. The end portions of adjacent slide support members 422, 423 are joined or connected, or are in contact, so that slide support members 422 and 423 collectively define a square frame surrounding the position input operation portion 325. The frame formed by the slide support members 422, 423 is covered by the surface plate 411.

The operation protuberance 323 is suspended by the wires 421 on the inside of the frame defined by the slide support members 422, 423. As shown in FIG. 25, two sets of two wires 421, for a total of four wires, are provided in the position input operation portion 325. One set of wires 421 is stretched between the two slide support members 422, and the other set of wires 421 is stretched between the two slide support members 423. As stated above, grooves are formed in the length directions of the slide support members 422, 423, and the grooves are open toward the inside of the above-described frame. The end portions of the wires 421 are housed in the grooves, and the two sets of wires 421 can move in sliding motion along the slide support members 422 and 423, respectively.

Further, the two sets of wires 421 each penetrate and pass through penetrating holes 432A formed in the shaft portion 432 of the operation protuberance 323, so that the shaft portion 432 is the point of perpendicular intersection of the two sets of wires 421. The penetrating holes 432A and wires 421 are not fixed; rather, the operation protuberance 323 can slide freely along the wires 421.

Wires 421 can slide freely with respect to the slide support members 422, 423, and wires 421 and the shaft portion 432 can slide freely with respect to one another. Hence the operation protuberance 323 is supported so as to enable free movement along the surface of the sensor base 418, in the length direction of the sliding support members 422 and perpendicularly in the length direction of the sliding support members 423. Hence the operation protuberance 323 can move freely along the surface of the sensor base 418. As the operation protuberance 323 is slid along the surface of the sensor base 418, the wires 421 move along the slide support members 422 and/or the slide support members 423 while sliding in the penetrating holes 432A, so that there is no impediment whatsoever to the motion of the operation protuberance 323.

The operation protuberance 323 is suspended by the wires 217 at a height which is elevated a prescribed distance from the surface of the sensor base 418, so that no friction occurs between the lower face of the shaft portion 432 and the surface of the sensor base 418. Consequently the operation protuberance 323 can be moved to an arbitrary position easily under an extremely small force. Preferably, the operation protuberance 323 is movable upward, downward, right, and left, and preferably diagonally in all directions.

Further, the slide support members 422, 423 are integral with the upper-side plates 413A, 413B and the surface plate 411, and can be rotated about the hinge 415 when the surface plate 411 is opened. When the surface plate 411 is opened, the operation protuberance 323 and the wires 421 rotate integrally with the sliding support members 422, 423. Hence the position input operation portion 325 enables movement of the various portions including the upper-side plates 413A, 413B to expose the sensor base 418, and for example a position indicator 327 (FIG. 17) can be used to perform position input operations on the exposed sensor base 418.

In this way, according to the tenth embodiment, advantageous results similar to those of the above-described eighth and ninth embodiments are obtained. Further, the position input operation portion 325 has a simple and low cost configuration in which the operation protuberance 323 is suspended by wires 421.

In the above configuration, the thickness and material of the wires 421 can be modified freely; it is sufficient that there be sufficient stiffness to enable support of the operation protuberance 323 above the sensor base 418 in the state in which there is no user operation. The number of wires is also arbitrary. Further, in place of the wires 421, for example, metal or resin rod members or similar support members, which act to support the operation protuberance 323 in conjunction with the support members 422, 423, can be used.

It should be understood that various modifications and variations may be made to each of the above-described embodiments. Further, features and operations of the above embodiments may be combined with one another in various combinations.

Further, in each of the above embodiments, configurations were explained in which the position of the operation protuberance 323 or of the core 471 was detected based on electromagnetic action between the coil 435 of the operation-side circuit 434 or the coil 476 of the indicator-side circuit 475 with the loop coil groups 441, 442 positioned in the sensor base 418. The invention is not limited to such configurations. For example, a static capacitance method may be used, in which a conductive element is provided either on the lower face of or within the flat pedestal 431 at a specific position, and a plurality of mutually insulated conductive lines are arranged in the sensor base 418, so that by detecting the change in static capacitance between these conductive lines, the position of the operation protuberance 323 can be detected. In this case, the conductive element protrudes as a narrow protrusion from the lower face of the operation protuberance 323, that is, from the face opposing the sensor base 418, and if the protruding conductive element makes contact with the sensor base 418, the position of the conductive element on the sensor base 418 is detected, so that high-precision position input operations can be performed. Further, if the core 471 of the position indicator 327 is formed from a conductor, the position of the core 471 on the sensor base 418 can be detected. The conductive elements of the flat pedestal 431 and core 471 need not be exposed, and the conductive elements may be covered by a resin or other material.

Further, by providing a resistive film or the like in the sensor base 418 the electrical resistance value of which changes according to a depressing pressure, depression operations in the sensor base 418 can be detected. When the operation protuberance 323 is depressed with a finger, or the sensor base 418 is depressed with the core 471 of the position indicator 327, the position at which the depressing operation is performed can be detected. Here, a narrow protrusion is provided in the lower face of the operation protuberance 323, that is, in facing relationship with the sensor base 418, and by depressing the sensor base 418, the position of the tip of the protrusion on the sensor base 418 is detected, so that position input operations can be performed with high precision.

In all of these modifications and variations, advantageous results similar to those of the above embodiments are obtained.

This invention is not limited to a remote control device 302 for a television or computer monitor, but can be applied to various types of electronic equipment. For example, this invention may be applied to PDAs (Personal Digital Assistants), portable telephone sets, and other portable electronic equipment, as well as to notebook computers. In particular, in application of the position input operation portion 322 to compact equipment suitable for transport, mounting is possible even in a housing of limited size. Moreover, by using a finger to operate the operation protuberance 323 position input operations are performed, and a position indicator 327 can be used for position input operations.

It should be understood by those skilled in the art that various modifications, combinations, sub-combinations and alterations may occur depending on design requirements and other factors, insofar as they are within the scope of the appended claims or equivalents thereof.

What is claimed is:

1. A position input device comprising:
a sensor portion having a detection face;
an operation element movable along said detection face and comprising a plate portion placed upon said detection face and an operation protuberance portion positioned erect on said plate portion;
a position detection unit, which detects the position of said operation element on said detection face; and
a rolling support portion provided between said plate portion and said detection face, wherein said rolling support portion rolls during movement of said plate portion while supporting said plate portion.

2. A position input device comprising:
a sensor portion having a detection face;
an operation element movable along said detection face;
a position detection unit, which detects the position of said operation element on said detection face; and
a support mechanism which supports said operation element, enabling sliding along said detection face in a prescribed direction and in a direction perpendicular to the prescribed direction
wherein said support mechanism comprises first and second wires arranged perpendicular to one another, a first set of slide support members arranged perpendicular to the second wire for slidably supporting the second wire, and a second set of slide support members arranged perpendicular to the first wire for slidably supporting the first wire and
wherein said operation element possesses perpendicular penetrating holes through which the first and second wires extend.

3. A position input device comprising:
a sensor portion having a detection face;
an operation element movable along said detection face;
a position detection unit, which detects the position of said operation element on said detection face;
a lid covering said detection face of said sensor portion and movable between opened and closed states; and
an external position indicator for performing an operation on said detection face at an operation position detectable by said position detection unit,
wherein said operation element is movable along said detection face with said lid in the closed state, and wherein said operation element is integral with said lid so as to move with said lid between the opened and closed states.

4. The position input device according to claim 3, wherein said lid includes a hole inside of which said operation element is exposed.

5. The position input device according to claim 4, wherein said operation element comprises a plate portion having a flat face substantially parallel to said detection face, and an operation protuberance portion erect on the plate portion and protruding from said hole.

6. The position input device according to claim 3, further comprising a support mechanism which supports said operation element to enable sliding in a prescribed direction along said detection face and in a direction perpendicular to the prescribed direction.

7. The position input device according to claim 6, wherein:
said support mechanism comprises first and second wires arranged perpendicular to one another, a first set of slide support members arranged perpendicular to said second wire for slidably supporting said second wire, and a second set of slide support members arranged perpendicular to said first wire for slidably supporting said first wire; and said operation element possesses perpendicular penetrating holes through which said first and second wires extend.

8. The position input device according to claim 3, wherein said position detection unit detects the operation position of said position indicator and the position of said operation element as an absolute position with respect to a detection area set in advance on said detection face, wherein the detection area set on said detection face when said lid is in the opened state is different from the detection area set on said detection face when said lid is in the closed state.

9. The position input device according to claim 3, wherein said position detection unit temporarily ceases detection of the detection position for a prescribed length of time when said lid is moved between said opened and closed states.

10. The position input device according to claim 3, further comprising coils provided in said sensor portion and said operation element, respectively, wherein said position detection unit detects the position of said operation element based on the electromagnetic coupling which occurs between the respective coils of said sensor portion and said operation element.

11. The position input device according to claim 10, wherein the coils of said sensor portion comprise a plurality of loop coils forming rings along said detection face of said sensor portion.

12. The position input device according to claim 3, wherein said position detection unit detects the position of said operation element with respect to said detection face based on electrostatic coupling between said sensor portion and said operation element.

13. The position input device according to claim 3, wherein said position detection unit detects the position of said operation element with respect to said detection face by detecting depressing pressure applied to said detection face by said operation element.

14. The position input device according to claim 5, wherein an upper face of said operation protuberance portion is formed as a curved surface.

15. The position input device according to claim 14, wherein the upper face of said operation protuberance portion possesses protrusions with curved tip portions.

16. The position input device according to claim 3, wherein said operation element is constructed and arranged to permit movement by a finger of a hand of a user holding the position input device, and wherein said operation element is movable in all directions within a plane parallel to a plane in which said sensor portion lies.

17. A remote control device comprising:
the position input device according to claim 3; and
a wireless transmission unit, which wirelessly transmits signals indicating the position of said operation element or the operation position of said position indicator, detected by said position input device.

18. A remote operation system comprising:
the remote control device according to claim 17; and
equipment for operation, the equipment including a display unit which displays images on a display screen of the display unit, a reception unit which receives signals transmitted by the wireless transmission unit, and a control unit which causes the display on said display screen to change based on signals received by said reception unit.

19. A method of operating a position input device, comprising:
providing a position input device comprising
a sensor portion having a detection face,
an operation element movable along the detection face,
a position detection unit for detecting the position of the operation element on the detection face,
a lid covering the detection face and movable between opened and closed states, and
an external position indicator for performing an operation on the detection face at an operation position detectable by the position detection unit;
moving the operation element along the detection face while the lid is in the closed state; and
detecting the position of the operation element on the detection face with the position detection unit.

20. The method of claim 19, including the steps of
detecting the operation position of the position indicator and the position of the operation element as an absolute position with respect to a detection area set in advance on the detection face, and
locating the detection area on the detection face when the lid is in the opened state in a position different from the detection area set on the detection face when the lid is in the closed state.

* * * * *